(12) United States Patent
McGuinness et al.

(10) Patent No.: US 12,445,446 B2
(45) Date of Patent: Oct. 14, 2025

(54) TECHNIQUES FOR UNIFYING MULTIPLE IDENTITY CLOUDS

(71) Applicant: Okta, Inc., San Francisco, CA (US)

(72) Inventors: Karl McGuinness, Oakland, CA (US); Matias Woloski, Punta del Este (UY)

( * ) Notice: Subject to any disclaimer, the term of this patent is extended or adjusted under 35 U.S.C. 154(b) by 214 days.

(21) Appl. No.: 18/053,721

(22) Filed: Nov. 8, 2022

(65) Prior Publication Data

US 2024/0154967 A1   May 9, 2024

(51) Int. Cl.
*H04L 29/06* (2006.01)
*H04L 9/40* (2022.01)

(52) U.S. Cl.
CPC ........ *H04L 63/102* (2013.01); *H04L 63/0815* (2013.01)

(58) Field of Classification Search
None
See application file for complete search history.

(56) References Cited

U.S. PATENT DOCUMENTS

| | | | |
|---|---|---|---|
| 9,087,189 B1 | 7/2015 | Koeten et al. | |
| 9,774,586 B1 | 9/2017 | Roche et al. | |
| 10,846,390 B2 | 11/2020 | Subramanian et al. | |
| 11,930,015 B2* | 3/2024 | Yang | H04L 63/102 |
| 2010/0132019 A1* | 5/2010 | Hardt | H04L 63/102 726/6 |
| 2013/0179573 A1* | 7/2013 | McCarty | H04L 63/0815 709/225 |
| 2017/0279793 A1 | 9/2017 | Trevathan et al. | |
| 2018/0077143 A1* | 3/2018 | Sridharan | H04L 63/0807 |
| 2018/0083967 A1 | 3/2018 | Subramanian et al. | |
| 2019/0306171 A1* | 10/2019 | Sisley | H04W 12/08 |

(Continued)

FOREIGN PATENT DOCUMENTS

| | | |
|---|---|---|
| CN | 116471029 A | 7/2023 |
| EP | 3528454 A1 | 8/2019 |

OTHER PUBLICATIONS

"International Search Report and Written Opinion of the International Searching Authority," issued in connection with Int'l Appl. No. PCT/US2023/034593, dated Feb. 15, 2024 (10 pages).

(Continued)

*Primary Examiner* — Jeffery L Williams
(74) *Attorney, Agent, or Firm* — Holland & Hart LLP

(57) ABSTRACT

Methods, systems, and devices for unifying multiple identity clouds are described. A software platform may receive a first request from a first user to build an authorization model for a resource using a first cloud platform. The authorization model may identify parameters associated with accessing the resource. The software platform may receive, from the first user, a second request to integrate the resource with a second cloud platform in accordance with the authorization model. The software platform may authorize the first request and the second request using a directory associated with the software platform. The software platform may receive a third request from a second user to access the resource using the second cloud platform. The software platform may authorize the third request using the directory. Authorization of the third request may be performed accordance to the authorization model and based on a second credential associated with the second user.

20 Claims, 9 Drawing Sheets

(56) References Cited

U.S. PATENT DOCUMENTS

| | | |
|---|---|---|
| 2020/0125542 A1 | 4/2020 | Purushothaman et al. |
| 2021/0112065 A1* | 4/2021 | Yang ............... H04L 63/108 |
| 2021/0281559 A1* | 9/2021 | Valecha ........... H04L 63/0853 |
| 2021/0390170 A1 | 12/2021 | Olden et al. |
| 2023/0036145 A1 | 2/2023 | Ramachandran et al. |
| 2023/0214514 A1* | 7/2023 | Levy ............... H04L 63/1433 |
| | | 726/6 |
| 2024/0146710 A1 | 5/2024 | Shah et al. |
| 2024/0154967 A1* | 5/2024 | McGuinness ....... H04L 63/0815 |
| 2024/0154968 A1 | 5/2024 | Kwon et al. |
| 2024/0364681 A1 | 10/2024 | Hu et al. |
| 2025/0111030 A1 | 4/2025 | Hamel et al. |
| 2025/0112906 A1 | 4/2025 | Kwon et al. |

OTHER PUBLICATIONS

"International Search Report and Written Opinion of the International Searching Authority," issued in connection with Int'l Appl. No. PCT/US2024/049480, dated Dec. 9, 2024 (12 pages).

* cited by examiner

TECHNIQUES FOR UNIFYING MULTIPLE IDENTITY CLOUDS

FIELD OF TECHNOLOGY

The present disclosure relates generally to database systems and data processing, and more specifically to techniques for unifying multiple identity clouds.

BACKGROUND

An organization may provide users of the organization with access to resources, such as software applications, that may be reviewed for security purposes, compliance, or license management, among other examples. Organizations that include several users must therefore manage several different access privileges. The necessity of managing identity and access privileges for several users may impose a considerable burden on the organizations.

In some cases, organizations may use tools, such as identity governance and administration (IGA) tools, to help manage identity and access privileges for users. However, for some use cases, conventional IGA tools may be deficient or sub-optimal in some current configurations.

SUMMARY

The described techniques relate to improved methods, systems, devices, and apparatuses that support techniques for unifying multiple identity clouds. For example, a software platform may receive a first request from a first user to build an authorization model for a resource using a first cloud platform, which may be associated with the software platform. The authorization model may identify one or more parameters associated with accessing the resource using the first cloud platform. In some examples, the software platform may receive, from the first user, a second request to integrate the resource with a second cloud platform in accordance with the authorization model. The software platform may authorize the first request and the second request using a directory associated with the software platform. For example, the software platform may authorize the first request and the second request based on a first credential associated with the first user. In some examples, the software platform may receive a third request from a second user to access the resource using the second cloud platform, which may be associated with the software platform. The software platform may authorize the third request using the directory associated with the software platform. In some examples, authorization of the third request may be performed at the software platform in accordance with the authorization model and based on a second credential associated with the second user.

A method for managing resources at a software platform of a device is described. The method may include receiving, from a first user, a first request to build an authorization model for a resource using a first cloud platform associated with the software platform, where the authorization model identifies one or more parameters associated with accessing the resource using a second cloud platform associated with the software platform, receiving, from the first user, a second request to integrate the resource with the second cloud platform in accordance with the authorization model, authorizing the first request and the second request using a directory associated with the software platform, where authorization of the first request and the second request is based on a first credential associated with the first user, receiving, from a second user, a third request to access the resource using the second cloud platform associated with the software platform, and authorizing the third request using the directory associated with the software platform, where the authorization of the third request is in accordance with the authorization model and based on a second credential associated with the second user.

An apparatus for managing resources at a software platform of a device is described. The apparatus may include a processor, memory coupled with the processor, and instructions stored in the memory. The instructions may be executable by the processor to cause the apparatus to receive, from a first user, a first request to build an authorization model for a resource using a first cloud platform associated with the software platform, where the authorization model identifies one or more parameters associated with accessing the resource using a second cloud platform associated with the software platform, receive, from the first user, a second request to integrate the resource with the second cloud platform in accordance with the authorization model, authorize the first request and the second request using a directory associated with the software platform, where authorization of the first request and the second request is based on a first credential associated with the first user, receive, from a second user, a third request to access the resource using the second cloud platform associated with the software platform, and authorize the third request using the directory associated with the software platform, where the authorization of the third request is in accordance with the authorization model and based on a second credential associated with the second user.

Another apparatus for managing resources at a software platform of a device is described. The apparatus may include means for receiving, from a first user, a first request to build an authorization model for a resource using a first cloud platform associated with the software platform, where the authorization model identifies one or more parameters associated with accessing the resource using a second cloud platform associated with the software platform, means for receiving, from the first user, a second request to integrate the resource with the second cloud platform in accordance with the authorization model, means for authorizing the first request and the second request using a directory associated with the software platform, where authorization of the first request and the second request is based on a first credential associated with the first user, means for receiving, from a second user, a third request to access the resource using the second cloud platform associated with the software platform, and means for authorizing the third request using the directory associated with the software platform, where the authorization of the third request is in accordance with the authorization model and based on a second credential associated with the second user.

A non-transitory computer-readable medium storing code for managing resources at a software platform of a device is described. The code may include instructions executable by a processor to receive, from a first user, a first request to build an authorization model for a resource using a first cloud platform associated with the software platform, where the authorization model identifies one or more parameters associated with accessing the resource using a second cloud platform associated with the software platform, receive, from the first user, a second request to integrate the resource with the second cloud platform in accordance with the authorization model, authorize the first request and the second request using a directory associated with the software platform, where authorization of the first request and the second request is based on a first credential associated with the first user, receive, from a second user, a third request to access the resource using the second cloud platform associated with the software platform, and authorize the third request using the directory associated with the software platform, where the authorization of the third request is in accordance with the authorization model and based on a second credential associated with the second user.

Some examples of the method, apparatuses, and non-transitory computer-readable medium described herein may further include operations, features, means, or instructions for establishing a connection between the second cloud platform and the resource in response to authorizing the third request.

Some examples of the method, apparatuses, and non-transitory computer-readable medium described herein may further include operations, features, means, or instructions for establishing an authorization scheme using the connection between the second cloud platform and the resource in accordance with the authorization model, where the authorization scheme includes single-sign-on authorization.

Some examples of the method, apparatuses, and non-transitory computer-readable medium described herein may further include operations, features, means, or instructions for assigning privileges to the second user using the connection between the second cloud platform and the resource, where the privileges may be based on the authorization model.

Some examples of the method, apparatuses, and non-transitory computer-readable medium described herein may further include operations, features, means, or instructions for transmitting, to the first user and based on the connection between the second cloud platform and the resource, information corresponding to a security event associated with the resource.

Some examples of the method, apparatuses, and non-transitory computer-readable medium described herein may further include operations, features, means, or instructions for receive, from the first user and based on the connection between the second cloud platform and the resource, information corresponding to a security event associated with the resource.

Some examples of the method, apparatuses, and non-transitory computer-readable medium described herein may further include operations, features, means, or instructions for transmitting, to the second user, the information corresponding to the security event associated with the resource.

In some examples of the method, apparatuses, and non-transitory computer-readable medium described herein, the resource may be included within a software application.

DETAILED DESCRIPTION

Figure 1:
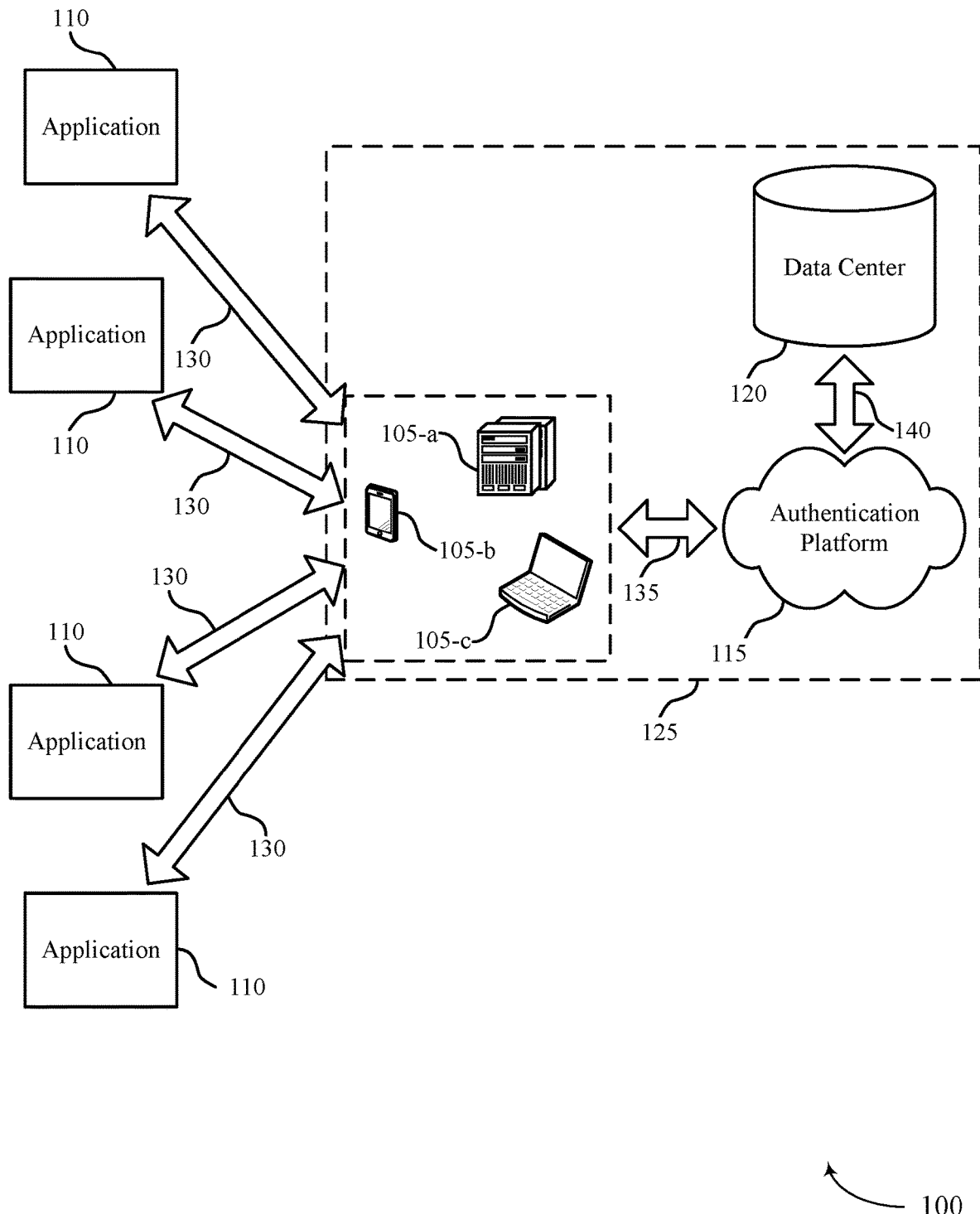
FIG. 1 illustrates an example of a system that supports techniques for unifying multiple identity clouds in accordance with aspects of the present disclosure.

In some examples, organizations may use cloud computing to increase a performance of the organization. In such examples, however, use of cloud computing (e.g., applications accessed using cloud computing) may lead to security vulnerabilities. As such, some applications may include security features, such as constrained access to the applications or resources included in the applications, or both. For example, an application may request a user (e.g., an employee of an organization) to log into an account within the application using authentication information, such as a combination of a username and a password. The application may use the authentication information to verify an identity of the user. In some examples, however, an organization may use an increased quantity of applications and managing identity and access privileges for several users across several applications may impose a considerable burden on the organizations. For example, for organization with an increased quantity of employees (e.g., users), managing authentication information across the multiple applications may impose a considerable burden. In some examples, an organization may employ a first cloud platform to managing authentication information across multiple applications. For example, the first cloud platform may provide the organizations with access to multiple applications (e.g., and resources within the multiple applications), while maintaining increased security. In some examples, the first cloud platform may include features for single sign on (SSO), identity governance and administration (IGA), privileged access management (PAM), and identity access management (IAM) across the multiple applications. In some examples, however, integrating such features with the multiple applications (e.g., each of the multiple applications) may be relatively complex and time consuming for an individual software vendor (ISV) managing the application. Additionally, or alternatively, configuring applications for SSO (or other features) may be relatively complex for users of the applications and lead to errors.

In some examples, in accordance with techniques for unifying multiple identity platforms, as described herein, a software platform may support a framework for ISVs to automate registration of applications for users. For example, within the software platform, an ISV may use a second cloud platform to build an application and integrate the application within the first cloud platform. In such an example, a user may obtain the application and initiate a registration process for the application using the software platform. For example, the software platform may receive, from a first user, a first request to build an authorization model for a resource using the first cloud platform. In such examples, the authorization model may identify one or more parameters associated with accessing the resource using a second cloud platform. Additionally, the software platform may receive a second request from the first user. In some examples, the second request may be to integrate the resource with the second cloud platform in accordance with the authorization model. The software platform may authorizing the first request and the second request using a directory associated with the software platform and the authorization of the first request may be based on a first credential associated with the first user. In some examples, the software platform may receive a third request from a second user. The third request may be to access the resource using the second cloud platform. In some examples, the software platform may authorize the second request using the directory associated with the software platform. For example, the software platform may authorize the second request in accordance with the authorization model and based on a second credential associated with the second user. In some examples, using the software platform to deploy and access resources may lead to increased performance for the first user and the second user, among other possible benefits.

Aspects of the disclosure are initially described in the context of a system for distributed computing. Aspects of the disclosure are also described in the context of block diagrams and a process flow. Aspects of the disclosure are further illustrated by and described with reference to apparatus diagrams, system diagrams, and flowcharts that relate to techniques for unifying multiple identity clouds.

FIG. 1 illustrates an example of a system 100 for distributed computing (e.g., cloud computing) that supports techniques for unifying multiple identity clouds in accordance with various aspects of the present disclosure. The system 100 may include client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-*a*), a smartphone (e.g., client device 105-*b*), or a laptop (e.g., client device 105-*c*). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 via one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a compute cluster, or any other type of computing system, component, or environment. In some examples, the application 110 may be operated by a user or group of users.

Authentication platform 115 may offer cloud-based services to the client devices 105, the applications 110, or both. In some examples, authentication platform 115 may support a database system such as a multi-tenant database system. In such cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using APIs) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the subsystem 125 (e.g., a software platform) may support one or more techniques for unifying multiple identity platforms. For example, the software platform may receive a first request from a first user (e.g., via a client device 105) to build a resource. In some examples, as part of the first request, the first user may build (e.g., request to build) an authorization model for the resource using a first cloud platform, which may be associated with the software platform. The authorization model may identify one or more parameters associated with accessing the resource using the first cloud platform. In some examples, the software platform may receive, from the first user, a second request to integrate the resource with a second cloud platform in accordance with the authorization model. For example, the first user may request to publish the resource on marketplace included in the cloud platform. In some examples, the first user may use a one-click configuration to synchronize metadata from first cloud platform with the second cloud platform. The software platform may authorize the first request and the second request using a directory associated with the software platform. For example, the software platform may authorize the first request based on a first credential associated with the first user. In such an example, the software platform may authorize the second request based on the authorization of the first request.

In some examples, the software platform may receive a third request from a second user (e.g., via another client device 105) to access the resource using the second cloud platform, which may be associated with the software platform. The software platform may authorize the third request using the directory associated with the software platform. In some examples, authorization of the third request may be performed at the software platform in accordance with the authorization model and based on a second credential associated with the second user.

It should be appreciated by a person skilled in the art that one or more aspects of the disclosure may be implemented in a system 100 to, additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
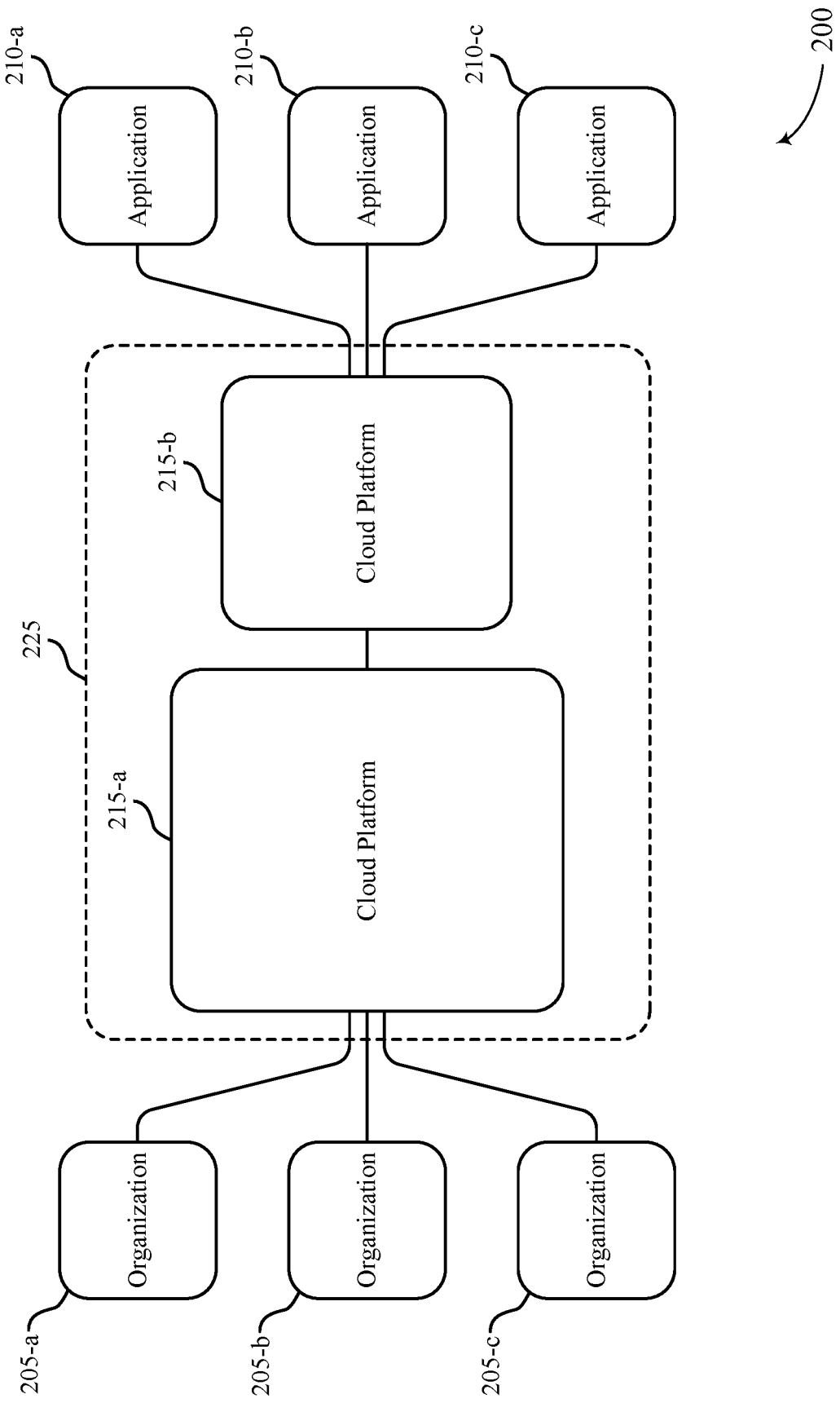
FIGS. 2 and 3 each illustrate an example of a block diagram that supports techniques for unifying multiple identity clouds in accordance with aspects of the present disclosure.

FIG. 2 illustrates an example of a block diagram 200 that supports techniques for unifying multiple identity clouds in accordance with aspects of the present disclosure. In some examples, the block diagram 200 may implement or be implemented by aspects of the system 100. For example, the block diagram 200 may be implemented at a software platform 225 or one or more cloud platforms 215 (e.g., a cloud platform 215-a, a cloud platform 215-b), or both, which may be examples of the corresponding entities as described with reference to FIG. 1.

In some examples, organizations 205 (e.g., an organization 205-a, an organization 205-b, an organization 205-c) may use cloud computing, such as cloud applications (e.g., an application 210-a, an application 210-b, an application 210-c), to increase a performance of the organization 205 (e.g., companies, enterprises). In such examples, however, use of cloud applications may lead to security vulnerabilities. As such, some cloud applications may include security features, such as constrained access to resources included in the cloud applications. For example, a cloud application may request a user (e.g., an employee of an organization) to log into an account within the cloud application using authentication information, such as a combination of a username and a password. The cloud application may use the authentication information to verify an identity of the user. In some examples, however, an organization may use an increased quantity of cloud applications and managing identity and access privileges for several users across several applications may impose a considerable burden on the organizations. That is, multiple cloud applications may include an identity management feature (e.g., an IAM feature) that users (e.g., each employee of the organization) of the cloud applications may comply with to use the cloud applications. For organization with an increased quantity of employees (e.g., users), managing authentication information across the multiple cloud applications may impose a considerable burden.

In some examples, the organizations 205 may employ the cloud platform 215-a (e.g., a workforce identity cloud) to managing authentication information across the multiple cloud applications (e.g., the applications 210). For example, the organizations 205 may use a quantity of technology vendors (e.g., ISVs) for internet, collaboration (e.g., within the organization and external to the organization), email, and billing, among other possible examples. Additionally, as a size of the organizations 205 increase, the organizations 205 may use more technology and, accordingly, an increased quantity of technology vendors. For example, the organizations 205 may utilize more resources, such as software applications (e.g., cloud applications), and may have multiple types of users of those resources, such as employees, contractors, and customers, among other examples. In some examples, the organizations 205 may implement one or more platforms (e.g., software platforms) for collaboration or for infrastructure, however, features provide by such platforms may fail to include some services to be implemented within the organization. That is, a likelihood of a single platform providing each service (e.g., all services, all applications) to be implemented within the organizations 205 may be relatively low and may constrain resource used by the organizations 205. For example, to reduce a quantity of platforms used by an organization, the organization may determine to constrain resources used by the organization to resources (or features) provided by a platform used by the organization for collaboration or for infrastructure (e.g., the platforms may become silos).

In some examples, however, the organizations 205 may utilize a cloud platform 215-a to increase technology adoption within the organizations 205. For example, the cloud platform 215-a may provide a workforce (e.g., a boundaryless workforce) with a zero-trust approach, which may lead to increased business performance. In some examples, a boundaryless workforce may refer to a workforce that includes employees, seasonal workers, contractors, and business partners that may be associated with an organization (e.g., and may be using multiple devices across multiple locations) and may use multiple resources (e.g., applications, infrastructure, APIs, cloud and on-premises servers) associated with the organization. That is, an organization (e.g., one or more of the organizations 205) may be associated with multiple types of users (e.g., employees, seasonal workers, contractors, and business partners) that may access multiple types of resources managed by (or utilized by) the organization. In such an example (e.g., with no clear boundary around resource access associated with the organization), the organization (e.g., a company) may extend a zero-trust posture of the organization to each user (e.g., the contractors, business partners, and employees, such as front office workers) to increase a performance of the organization. That is, a trust boundary associated with the organization may include each entity (e.g., any person or other organization) associated with the organization.

For example, a devices of an employee of the organization (e.g., a computer of a support representative at a call center of the organization) may be breached. In such an example, while a technical impact of the breach may be relatively small (e.g., the breach may occur at a single computer), the breach may negatively impact a trust boundary within the workforce of the organization and other organizations (e.g., third parties) associated with the organization. For example, such a breach may lead to security vulnerabilities for the organization and third parties associated with the organization. Accordingly, the organization may implement the cloud platform 215-a, such that a technology environment for third parties and the workforce of the organization may have increased security protections (e.g., from breaches). For example, the organizations 205 may implement the cloud platform 215-a to reduce identity challenges and increase security for the organizations 205.

In some examples, the cloud platform 215-a may enhance onboarding for workforces (e.g., boundaryless workforces) of the organizations 205. For example, identity governance features supported at the cloud platform 215-a may enable a workforce of an organization (e.g., one or more of the organizations 205) to obtain suitable entitlements to tools the workforce may use for work (e.g., tasks, jobs). In some examples, entitlements may change throughout a lifecycle of the workforce within the organization. For example, a user associated with the organization (e.g., a contractor) may complete a project and, accordingly, may refrain from utilizing access to an application associated with the organization that may be grated to the employee for the project. In such an example, an access certification feature supported at the cloud platform 215-a may be used inform another user (e.g., an employee included in an information technology (IT) team) associated with the organization of a contract expiration or extension associated with the contractor. That is, the identity governance and access management features (e.g., IGA and IAM features) supported at the cloud platform 215-a may enable the cloud platform 215-a to increase security for multiple users across multiple stages of a respective lifecycle of the multiple users within the organization. For example, the software platform 225 may include features for automating access policy enforcement with access certification campaigns and automated reports. In some examples, the access requests may be used in accordance with one or more applications utilized by the organization. For example, the access requests may be transmitted or received (e.g., between users associated with the organization or between the cloud platform 215-a and users associated with the organization) with a chat-based (e.g., messaging-based) application. Additionally, or alternatively, the access request may include a capability (e.g., using workflows) to orchestrate access governance (e.g., with relatively low or no code provided by the organization), such that the organization may (e.g., automatically) identify inactive users. In some examples, the software platform 225 may support multiple types of resources including business applications and infrastructure. Additionally, or alternatively, each resource may include a scale (e.g., a sliding scale) of entitlements, which may range from cloud application access to relatively highly privileged access (e.g., that may be closely guarded and timebound). As described herein, entitlements may refer to resources (e.g., software applications or resources within software applications) that a user may be granted access to use (e.g., may own).

In some examples, the cloud platform 215-a (e.g., a workforce identity cloud) may enable increased performance for users (e.g., employees associated with respective IT teams or security teams within the organizations 205) across multiple stages of an identity lifecycle. For example, the cloud platform 215-a may enable the organizations 205 to complete projects relatively quickly, remediate security threats (e.g., in real time), and provide information to stakeholders associated with the organizations 205.

In some examples, the cloud platform 215-a may correspond to technology the organizations 205 may use to connect to multiple (e.g., all) resources. For example, the cloud platform 215-a may facilitate access to the applications 210 for the organizations 205, such that respective users (e.g., employees) associated with the organizations 205 may obtain suitable technologies for a suitable quantity of time (e.g., in a zero-trust environment). For example, access to a resource may lead to increased security risks for a workforce of an organization (e.g., one or more of the organizations 205). In such examples, the organization may use the cloud platform 215-a to enable multiple users (e.g., employees) associated with the organization access to multiple types of resources (e.g., techniques, such as cloud applications) to be used to complete work (e.g., jobs, tasks). For example, the cloud platform 215-a may correspond to an identity provider (e.g., a single identity provider, a single control plane, a single directory) for applications, systems, and tools, among other examples of resources, utilized within the organization. Additionally, or alternatively, the cloud platform 215-a may provide automation for identity compliance and business processes, including onboarding applications for users, onboarding users (e.g., employees), compliance reviews for users, role changes of users within the organization, and departures of users from the organization.

In some examples, the cloud platform 215-*a* may reduce a likelihood of malicious cyber-attacks, such as credential theft or phishing attacks, succeeding. As described herein, a phishing attack may refer to a type of malicious cyber-attack in which an attacker may transmit a message (e.g., an email) to a user in an attempt to obtain information associated with the user (or other users) or to deploy malicious software on an infrastructure (e.g., computer, server) associated with the user. For example, some attackers may use websites to carry out phishing attacks to obtained credentials associated with an organization (e.g., one or more of the organizations 205). In such an example, as a quantity of websites used for phishing attacks increases, a susceptibility of the organization to the phishing attacks (e.g., a likelihood of the organization being a victim of a phishing attack) may also increase. Accordingly, to reduce the likelihood of malicious attacks succeeding, the cloud platform 215-*a* may provide a framework for passwordless authentication. For example, the cloud platform 215-*a* may provide a workforce of the organization with passwordless authentication to access resources for work. In some examples, the workforce (e.g., employees, contractors, and suppliers) of the organization may include hybrid and remote roles, which may lead to an increased risk for the organization. In such examples, however, the cloud platform 215-*a* may provide passwordless authentication across multiple types of resources (e.g., the applications 210, actions, single sign-on interactions, social connections, log streams), multiple types of devices (e.g., smartphones, laptops, desktops, wearable devices), and multiple types of operating systems. For example, the passwordless authentication features provided using the cloud platform 215-*a* may reduce phishing attacks that may target multiple types of users and multiple types of resources associated with the organizations 205. That is, the cloud platform 215-*a* may provide one or more phish-proof identity solutions across user types and devices associated with the organizations 205. As described herein, phish-proof may refer to a capability to reduce (e.g., minimize) successful phishing attacks.

In some examples, the cloud platform 215-*a* may provide one or more enhancements for controls of other authenticators, such as factors associated with web authentication APIs and fast identity online (FIDO) authentication credentials (e.g., passkeys). For example, the cloud platform 215-*a* may provide customizable authentication, such that an organization (e.g., one or more of the organizations 205) may select authentication factors that align with a security posture of the organization. As described herein, a security posture may refer to a security status of a network (e.g., people, hardware, software, policies) associated with an organization. Additionally, or alternatively, the passwordless features provided by the cloud platform 215-*a* may extend phish-proof identity solutions beyond some users (e.g., employees) of the organization to extend an ecosystem of the organization. For example, the phish-proof identity solutions may include employees, contractors, and customers, among other examples of users that may be associated with the organization. In such an example, by using the cloud platform 215-*a* as an identity provider, the organization may allocate more resources (e.g., energy, time, finances) to customers of the organization and less resources to managing authentication credentials.

In some examples (e.g., in addition to enabling phish-proof identity solutions for multiple types of users associated with the organizations 205), the cloud platform 215-*a* may provide access that may be unconstrained to a single point in time and unconstrained to a single resource. That is, the cloud platform 215-*a* may provide access across multiple resources for an extended duration. For example, the cloud platform 215-*a* may support the principle of least privilege (POLP) access in which an organization (e.g., one or more of the organizations 205) may customize authentication for users associated with the organization, such that the users may be granted permission to read, write, or execute resources to perform work. In some examples, the cloud platform 215-*a* may support least privilege access and governance across a lifecycle associated with a user (e.g., across multiple roles the user may fill within the organization) and across multiple resources. In some examples, a component (e.g., each component) of IAM, IGA, and PAM supported by the cloud platform 215-*a* may provide increased control to the organization (e.g., teams within the organization) with reduced complexity, reduced resource overhead, and increased security. The identity governance (e.g., IGA) and privileged access (e.g., PAM) features supported by the cloud platform 215-*a* may enable the organizations 205 to identify users (e.g., determine which users) may be provided access to one or more resources (e.g., which resources) with reduced (e.g., minimal) complexity.

For example, the identity governance features provided by the cloud platform 215-*a* may enable customers of an organization (e.g., one or more of the organizations 205) to automate multiple types of actions across access management and governance systems associated with the organization, while increasing productivity for some users (e.g., IT teams) associated with the organization (e.g., and without reducing workforce agility). Additionally, or alternatively, the privileged access features provided by the cloud platform 215-*a* may provide enhanced PAM, in which privileged governance, secrets management, and compliance audit capabilities that may be used by the organization (e.g., by IT and security teams within the organization) for PAM may be combined within the cloud platform 215-*a* (e.g., a same workforce identity solution). Accordingly, the cloud platform 215-*a* may enable privileged users benefits and phish-proof passwordless access. For example, the cloud platform 215-*a* may enable the organizations 205 to operate without single-use (e.g., one-off) passwords, identity siloes, and relatively bloated software.

For example, the organization 205-*a* may include a workforce of multiple users (e.g., tens of thousands of users, such as tens of thoughts of employees, contractors, and suppliers) across multiple locations (e.g., hundreds of thousands of locations) and multiple server instances. In such an example, the cloud platform 215-*a* may provide a unified solution in which a first user (e.g., an engineer) in a first location may request access to a cloud server associated with the cloud platform 215-*a*. In some examples, the first user may request access to the cloud server from another user (e.g., a manager) in a second location. In such an example, using the cloud platform 215-*a*, the first user may be granted access to the cloud server relatively quickly (e.g., instantly), for example without using a static credential or transmitting the request to the second user (e.g., via a ticket to be filled). Additionally, or alternatively, the cloud platform 215-*a* may restrict the access granted to the first user (e.g., automatically) in response to the cloud platform 215-*a* detecting a relatively high-risk login attempt (e.g., with an audit trail for multiple steps of the authentication process). That is, the cloud platform 215-a may provide the organizations 205 with phish-proof access to multiple resources, centralized identity management for the multiple resource, and enable automated compliance capabilities across the lifecycle of respective users associated with the organizations 205. As described herein, centralized identity management may refer to the collection and storage of user identity data, such that users may access multiple resources (e.g., applications, websites, or other systems) with a same set of credentials.

In some examples, it may be desirable for the applications 210 to support access management, extensibility, login security, and user management, among other possible features. For example, users of the applications 210 (e.g., users associated with the organizations 205) may wish to login to the applications 210 with multiple types of passwordless or social login methods. Additionally, or alternatively, an ISV (e.g., a developer) of an application (e.g., one or more of the applications 210) may wish to determine whether a user of the application may correspond to a bot or a legitimate user. In some examples, developers and users of the organizations 205 may wish for features associated with preventing the use of breached credentials (e.g., credentials breached from the applications 210). That is, users may wish to use and developers may wish to build applications with enterprise-ready identity features. As described herein, enterprise-ready identity features may refer to identity features that may be suitable for organizations with constraints that may be distinct from consumer or relatively small business segments. In some examples, however, integrating enterprise-ready identity features into an application (e.g., one or more of the applications 210) may be relatively complex. Accordingly, some developers (e.g., ISVs) may determine to integrate (e.g., deploy) applications with the cloud platform 215-b. For example, developers of the applications 210 may use the cloud platform 215-b (e.g., a customer identity cloud) to deploy, and in some examples build, the applications 210.

For example, customer identity may impact how developers of applications may interact with users of the applications. In such an example, using the cloud platform 215-b to deploy the applications may lead to growth opportunities and increased brand recognition for the developers (e.g., business developing the applications). For example, it may be desirable for developers build differentiated products, however maintaining and integrating differentiated products (e.g., tools, passwordless standards, other types of features) into applications may be relatively complex and time consuming, which may lead to reduced productivity and reduced innovation. For example, threat vectors, standard compliance, and evolving user experience may compound and increase complexities associated with integration across a customer identity footprint associated with the applications. That is, it may be desirable for developers to reduce a quantity of time used to build and maintain identity within an organization. As such, developers may use the cloud platform 215-b to deploy (e.g., and build) the applications 210 (e.g., consumer applications, SaaS applications) thereby reducing the burden associated with building and maintaining identity for the applications 210. That is, the cloud platform 215-b (e.g., a customer identity cloud) may enable application developers, digital leaders, and security teams to allocate more resources to innovation.

In some examples, the cloud platform 215-b may support customer identity solutions which may accelerate business, without necessitating that users sort through multiple feature functions. For example, the cloud platform 215-b may support flexible identity services. In some examples, the cloud platform 215-b may provide security for the applications 210 and increase convenience associated with using the applications 210. For example, developers of an application (e.g., digital teams associated with an ISV of one or more of the applications 210) may increase revenues through use and reuse of the application (e.g., by users of one or more of the organizations 205, customers), while maintaining security protections. Accordingly, the cloud platform 215-b (e.g., a customer identity cloud) may provide a framework the digital teams (e.g., developing consumer applications) to simplify registration and login across multiple devices, stacks, and platforms, for increased customer acquisition and retention, increased user experience, and a fuller view of user data. For example, the cloud platform 215-b may provide multiple features to aid the digital teams in increasing a digital experience associated with the application. For example, the cloud platform 215-b may provide a customizable user experience for the applications 210 including no-code or low-code universal login and multiple types of social and passwordless login options. As described herein, no-code may refer to development of a software application or features in which a developer (or manager) of the feature or application may be unaware how associated coding for the development may work and low-code may refer to development of a software application of feature in which a developer (or manager) of the feature or application may use some (e.g., a relatively low quantity) of code to customize the feature or application. Additionally, or alternatively, the cloud platform 215-b may provide personalization through progressive profiling, which may enable developers of the applications (e.g., marketers) to collect first-party data over time. In some examples, the cloud platform 215-b may aid in the prevention of revenue loss (e.g., for the developers of the applications 210) by providing security features that distinguish between normal user activity and activity that may be associated with attackers. That is, the cloud platform 215-b may provide for improved developer experiences, while maintaining security and privacy.

In some examples, the cloud platform 215-b may provide for accelerated growth of developers which may develop applications for organizations (e.g., for companies with business customers). For example, some software platforms may provide constrained feature options for companies with business customers (e.g., SaaS companies, companies developing SaaS applications), and product and engineering teams of such companies may rely on multiple software platforms (e.g., some combination of consumer and workforce identity solutions) to obtain a set of desired features for applications (e.g., SaaS applications) developed by the companies. Accordingly, the cloud platform 215-b may provide multiple (e.g., different) tools for such companies to develop applications, such as SaaS application or other types of applications, that may be enterprise-ready. For example, the cloud platform 215-b may provide multiple tools for enterprise federation and other identity systems which may provide relatively easy to implement functionality and reliable and dynamic scaling to satisfy constraints of enterprise customers. That is, the cloud platform 215-b may enable developers to obtain enterprise-level identity features relatively fast and relatively easily. The cloud platform 215-b may evolve, such that the cloud platform 215-b may accommodate changes in standards (e.g., de-facto enterprise standards, such as service organization control 2 (SOC2) standards) and functionality. For example, the cloud platform 215-b may provide sets of identity capabilities, including future sets of identity capabilities, for developers (e.g., SaaS developers) that may use SSO and passwordless access.

For example, developers (e.g., a company, an ISV) of the application 210-a may use the cloud platform 215-b to integrate customer identity within the application 210-a (e.g., a marketing stack or other infrastructure associated with the application 210-a), which may enable the application 210-a to support open standards, pre-built integrations, multiple SDKs, multiple APIs, extensibility, and deployment in public or private clouds. In some examples, by using the cloud platform 215-b for customer identity associated with the application 210-a, the developers of the application 210-a may use less time (e.g., a relatively shorter duration) on identity management and more time (e.g., a relatively longer duration) on innovation. In some examples, to support the integration of customer identity within the applications 210 the cloud platform 215-b may support passkeys as an authenticator across the applications 210. For example, passkeys may use biometric device support (e.g., face identification) to support credential sharing across devices. For instance, enrollment of face identification on a device, such as a smartphone, may enable access to an application on the smartphone and another device, such as a laptop, to be authenticated with a fingerprint. That is, passkeys may provide customers a passwordless experience across multiple devices. In some examples, however, passkeys may enable third parties to store credentials associated with users, which may lead to increased security risks. For example, some users (e.g., consumers) of applications that support passkeys may be associated with industries that have increased regulations and compliance constraints. Accordingly, the cloud platform 215-b may support one more capabilities, such as financial data exchange constraints that may be adopted in some locations, which may enable developers of applications to satisfy the regulations and compliance constraints. That is, the cloud platform 215-b may enable developers to build features within applications for industries that have increased regulations and compliance constraints, such as financial services, healthcare, or utilities, among other examples, such that the users of the applications that are included in such industries may satisfy the regulations and compliance constraints. For example, the cloud platform 215-b may support financial APIs and key management, which may enable developers of financial services applications to allocate more resources to improving a digital experience associated with the financial service applications and less time managing identity compliance.

In some examples, customer identity may encompass privacy, security, and experience. Accordingly, to support customer identity, the cloud platform 215-b may enable developers to improve user experience and satisfy regulatory compliance, while providing increased security. For example, the cloud platform 215-b may include a security center which may provide increased visibility to developers. For example, the security center may enable monitoring (e.g., real-time monitoring), detection, and response to potential identity security events (e.g., directly, such as through a dashboard or by integrating with one or multiple security stacks, or both).

In some examples, the organizations 205 and the developers of the applications 210 may use the software platform 225, which may integrate and provide interoperability between the features (e.g., the workforce identity features) provided by the cloud platform 215-a (e.g., a workforce cloud) with the features (e.g., the customer identity features) provided by the cloud platform 215-b (e.g., a customer identify cloud). For example, the software platform 225 (e.g., an integration network) may be an example of an identity provider (e.g., a single identity provider) across the organizations 205 and the applications 210 (e.g., used by the organizations 205) with increased resiliency and uptime for the cloud platforms 215 (e.g., reliability of about 99.99% uptime).

In some examples, the software platform 225 may provide infrastructure reliability and one or more opportunities for feature (e.g., product, technology) connections across the cloud platforms 215. For example, the software platform 225 (e.g., a unified identity platform) may correspond to a common integration layer in which technologies may be available to users (e.g., users associated with the organizations 205 and developers of the applications 210) across the cloud platforms 215. For example, the software platform 225 may support no-code automation (e.g., workflows) across the cloud platforms 215. In some examples, providing workflows (e.g., automated proactive measures and responses) across the cloud platforms 215 may enable more extensibility and provide customizability for the organizations 205 and the applications 210. For example, in response to detecting a security incident associated with a resource managed by the software platform 225 (e.g., a resource included in one or more applications 210) or a device being used to access a resource managed by the software platform 225, or both, the software platform 225 may trigger a workflow for one or more users (e.g., teams, employees) associated with an organization (e.g., one or more of the organizations 205) or a developer that may have built the resource, or both, to aid in protecting the organization from the security threat. Additionally, or alternatively, the software platform 225 may support risk signal sharing across the cloud platforms 215, which may be implemented using tools such as the security center and credential-based attack prevention technologies. In some examples, the software platform 225 may aggregate logins across the cloud platforms 215, which may provide more robust authentication data and lead to improved access decisions and protection.

In some examples, by supporting integration and interoperability across the cloud platforms 215, the software platform 225 (e.g., an integration network) may enable the organizations 205 (e.g., workforce customers) to connect to improved cloud solutions and increase businesses, while maintaining security protections through enterprise-grade capabilities. Additionally, or alternatively, by supporting integration and interoperability across the cloud platforms 215, the software platform 225 may provide developers of the applications 210 (e.g., SaaS companies) with relatively fast enterprise-readiness, exposure to multiple users (e.g., users associated with the organizations 205, tens of thousands of workforce customers), and information regarding use of the applications 210. For example, with multiple applications (e.g., thousands of SaaS applications) built using the cloud platform 215-b and integrated with the cloud platform 215-a, which may be used by multiple organizations 205 (e.g., tens of thousands of organizations), the software platform 225 may provide a hub for an increased quantity of data and insights. Such data may provide one or more benefits for developers of the applications 210 and for the organizations 205 using (e.g., adopting) the applications 210. For example, the applications 210 may obtain insights (e.g., information, analytics, statistics) regarding which of the applications 210 the organizations 205 may be using and which of the applications 210 may be exposed (e.g., via APIs) to developers of the applications 210. The developers may use the insights to customize experiences for the organization 205 using the software platform 225. For example, the software platform 225 (e.g., an integration network) may provide the organizations 205 with improved integrations, which may enable increased development of the applications 210 (e.g., SaaS applications) and may lead to an increased quantity of insights (e.g., data, analytics associated with use of the applications 210).

In some examples, the software platform 225 may provide a bridge between the organizations 205 (e.g., enterprises) using the cloud platform 215-a and the applications 210 (e.g., SaaS applications). For example, the organization 205-a may implement (e.g., adopt) the application 210-a using the cloud platform 215-a (e.g., to obtain the SSO integration). That is, an employee within the organization 205-a may use a dashboard (e.g., via a client device) to request assess to the application using an SSO. In such an example, the cloud platform 215-a may connect to the cloud platform 215-b, which may be the identity provider the application 210-a uses for authentication. That is, the software platform 225 may manage both sides of an authentication pathway (e.g., a process flow for authentication) used by the organization 205-a to access the application 210-a. In some examples, by managing both sides of the authentication pathway the software platform 225 may provide improved identity practices for multiple industries. Additionally, or alternatively, by managing both sides of the authentication pathway the software platform 225 may reduce a threshold associated with developing enterprise-ready applications and creating an ecosystem that enables flexible and reliable security. That is, the software platform 225 may correspond to an independent identity provider that may enable connected and secure futures beyond a stack or provider (e.g., beyond a single stack or a single provider). In some examples, the software platform 225 may support SSO adoption from protocols, such as secure web authentication (SWA), security assertion markup language (SAML), and open identity connect (OIDC). Additionally, or alternatively, through connecting the cloud platforms 215, the software platform 225 may facilitate implementation of standards, SSO, provisioning, continuous authentication, and fine grained authorization, among other examples of features, to enhance zero-trust and governance for the organizations 205.

In some examples, the software platform 225 may enable the applications that may be built using the cloud platform 215-b to be accessed using the cloud platform 215-a. That is, developers may use the cloud platform 215-b to build the applications 210 and integrate the applications 210 with the cloud platform 215-a, such that users of the cloud platform 215-a may access the applications 210. Additionally, or alternatively, the software platform 225 may enable the developers of the applications 210 to satisfy enterprises identity constraints and provide the developers with information and tools for building enterprise-ready applications. For example, the software platform 225 may include content designed to aid developers of the applications 210 (e.g., SaaS builders) in achieving identity solutions. As described herein, identity solutions may refer to features which may be used to solve problems associated with managing credentials or other identifying information. The software platform 225 may provide for relatively safer organizations (e.g., enterprises) and increased innovation for SaaS ecosystems.

For example, the organizations 205 may use the software platform 225 to integrate the applications 210 (e.g., cloud applications) used at the organizations 205 and to centralize identity within the software platform 225, for example rather than individually managing identity within each of the applications 210. That is, the software platform 225 may be connected to each application 210 used at the organizations 205. In some examples, by connecting to multiple applications used at the organizations 205, the organization 205 may select applications 210 (e.g., technologies) suitable for the business of the organization while maintaining security, usability, and productivity, among other examples. That is, the software platform 225 may provide relatively independent identity and neutrality among one or more of the applications 210. The software platform 225 may connect and integrate the applications 210, such that identity may be independent (e.g., separate) from the applications 210. That is, by using the software platform 225, users of the applications 210 may refrain from managing multiple (e.g., separate) credentials for each of the applications 210. In some examples, the software platform 225 may provide one or more alternatives to monolithic technology stacks. That is, the software platform 225 may provide an identity solution across multiple stacks and multiple sets of cloud applications. For example, the software platform 225 may provide a framework for customizable technology within an organization, such that technology utilized within the organization may be suitable for the business of the organization. That is, the software platform may enable the organizations 205 to utilize multiple (e.g., different) ISVs for multiple (e.g., different) types of technology.

In some examples, the software platform 225 may be referred to as an integration network. For example, the software platform 225 may provide a mapping of a cloud access ecosystem in which identity may be integrated across the cloud access ecosystem. That is, the software platform 225 (e.g., the integration network) may connect the organizations 205 (e.g., users associated with the organization) to multiple applications 210 within the software platform 225 (e.g., a cloud access ecosystem). In some examples, connecting an organization to multiple cloud applications via a centralized identity provider (e.g., the software platform 225) may reduce a burden associated with managing identity within the organization. Additionally, or alternatively, a centralized identity provide may provide automated identity compliance and business processes including onboarding, compliance reviews, managing role changes or departures (e.g., of employees within the organization), among other possible examples. In some examples, centralized identity may lead to identity being synchronized across multiple cloud applications (e.g., the applications 210) and systems used at the organization (e.g., one or more of the organizations 205). Additionally, or alternatively, centralized identity may reduce a susceptibility to malicious security attacks (e.g., phishing attacks). For example, centralized identity may reduce a susceptibility to malicious security attacks on users (e.g., employees associated with digital content teams, development teams) associated with an organization as well as an infrastructure and contractors associated with the organization.

Additionally, or alternatively, the software platform 225, which provides centralized identity, may be capable of identifying whether a user of an application is a bot or a legitimate user. In some examples, the software platform 225 may be capable of providing multiple types of login methods, such as passwordless or social login methods. Additionally, or alternatively, the software platform 225 may be capable of preventing usage of multiple (e.g., tens of millions) of breached credentials. In some examples, identity may be a center of a technology landscape because use of cloud applications, such as the applications 210, may rely on identity and users may reply on the cloud applications to accomplish goals. Accordingly, by providing centralized identity across the applications 210 and users of the organizations 205, the software platform 225 may improve performance for the applications 210 and the organizations 205.

In some examples, as organizations evolve (e.g., acquiring businesses, add resources), managing identity may become relatively more complex (e.g., for IT teams and digital management teams within the organization) and may necessitate management of identity across multiple cloud applications, systems, and devices, among other examples. For example, to be relatively agile and nimble, employees of the organization (e.g., a workforce) may wish to utilize multiple types of technologies (e.g., securely) to increase performance (e.g., drive better business outcomes) and developers of technologies (e.g., applications) may wish to develop relatively long-term relationships with the organization (e.g., customers). In some examples, development of such relationships may begin at a login box used by the employees of the organization to access an application.

In some examples, the software platform 225 may provide a framework to connect identity across multiple aspects of an organization may enable management of security parameters associated with the organization (e.g., employees, contractors, and vendors) across a range of endpoints and devices. That is, using the software platform 225, a workforce of the organization may access resource securely and seamlessly, irrespective of whether the workforce may access the resources using on-premises or cloud applications, cloud servers, databases, or containers, among other examples. Such security may include visibility across the resources and provide a relatively simple, secure, and user-friendly experience for customers.

Additionally, or alternatively, such security may provide for increased efficiency and productivity for developers, digital management teams, and security teams while maintaining visibility into how responsibilities may be associated with customer experience. That is, the software platform 225 may provide increased access to an increased quantity of resources, while providing control and customizability identity solutions for the organization utilizing the software platform 225. Accordingly, the software platform 225 may provide a catalyst for growth within the organization, while protecting the workforce and customer base of the organization.

For example, using the cloud platform 215-b, the software platform 225 may enable increased innovation for the developers of the applications 210. For example, the software platform 225 may enable the developers to customize identity (e.g., an authorization model) for the applications 210 (e.g., based on the stack utilized by the developers). Additionally, or alternatively, the software platform 225 may provide customizability and extensibility to developers, such that the developers may adapt features of the applications 210 to consumers of the applications 210 (e.g., the organizations 205). The cloud platform 215-b may enhance digital experiences across users (e.g., consumer) and applications (e.g., SaaS applications). The software platform 225 (e.g., an identity platform) may correspond to an interoperability layer across the cloud platforms 215, which may include an integration network. That is, the software platform 225 may include an integration hub between the cloud platforms 215, such that developers may create improved digital experiences for customers and organizations may increase productivity for a workforce.

For example, the software platform 225 may facilitate use, by the organizations 205, of the cloud platform 215-a (e.g., the workforce identity platform) which may include one or more features. In some examples, employees (or other users, such as contractors) of the organizations 205 may use the cloud platform 215-a (e.g., via one or more client devices) to accelerate business (e.g., as a growth engine) and enable the organization 305 to become an identity-first (or identity-powered) organization. That is, the cloud platform 215-a may enable an agile workforce, high-performing IT, and identity-powered security for the organizations 205.

Additionally, or alternatively, developers (or other users, such as contractors) of the applications 210 may use the cloud platform 215-b to improve digital experiences and improve innovation. That is, the cloud platform 215-b may provide the organizations 205 and developers of the applications 210 with access to customizable and extensible technology and increased security reliability. In some examples, using the cloud platforms 215, the software platform 225 may provide increased security reliability with automation and features for phishing-resistance. Additionally, or alternatively, the software platform 225 (e.g., an identity platform) may provide for increased IT productivity and workforce agility through unified solutions, including enhanced governance and privileged access capabilities. For example, the software platform 225 may provide unified access governance across the cloud platforms 215 and access to multiple types of applications and systems, such as open-source systems (e.g., a cloud-native k8 infrastructure, such as Kubernetes). For example, the software platform 225 may provide passwordless access to a cloud-native k8 infrastructure, which may be utilized for PAM. In some examples, the software platform 225 may include cloud-native features for secure access to privileged resources using a privileged credentials vault and privileged governance. As described herein, a credential vault may refer to a repository that stores credentials (e.g., user IDs, passwords) for shared accounts and resources.

In some examples, the software platform 225 may provide features for identity management including anything-as-a-source (XaaS), in which the software platform 225 may connect to multiple sources of truth (e.g., any source of truth including sources of truth without integrations) and, for example, leverage existing resources (e.g., existing human resources systems) as a source capability. As described herein, a source of truth may refer to an aggregation of data from multiple systems within an organization to a single location. That is, users of the applications 210 (e.g., one or more of the organizations 205) with unsupported human resources systems may use the software platform 225 to realize one or more benefits of XaaS. For example, XaaS may enable the organizations 205 to integrate multiple (e.g., any) sources of truth with the software platform 225, which may lead to one or more benefits for human resource-driven provisioning from the multiple sources of truth. In some examples, XaaS features provided by the software platform 225 may provide the organizations 205 with flexibility to determine (e.g., define, identity, select) terms of synchronization between the software platform 225 and one or multiple sources of truth.

For example, software platform 225 (e.g., a unified identity platform) may enable the organizations 205 with extended business ecosystems, by combining identity and access management features, identity and access governance features, and privileged access management features through a cloud-native control plane, which may lead to enterprise agility and increased IT productivity. In some examples, the software platform 225 may be extensible, flexible, and may support multiple users, sources, and resources, including future users, future sources, and future resources. Additionally, or alternatively, the software platform 225 may be relatively easy to use and may improve governance and privileged access, by providing features for administrators and users (e.g., of the organizations 205) and aligning multiple workstreams. In some examples, the software platform 225 may provide unified features for reliability, scalability, and security.

Additionally, or alternatively, the software platform 225 may include one or more automation features and access technologies to aid the organizations 205 (e.g., enterprises) in securing an extended workforce and supply chains. For example, the software platform 225 may provide for improved organizational security and identity threat response through an automation of ecosystem expansion and biometrics, among other examples. For example, the software platform 225 may provide for enhanced phishing resistance (e.g., end-to-end phishing-resistant features), passkey management, enhanced controls for APIs (e.g., web authentication APIs), and passwordless access management capabilities. Additionally, or alternatively, the software platform 225 may provide for enhanced security features for extended business ecosystems including biometric login for external business partners, enhanced security checks for unmanaged devices (e.g., devices associated with, but unmanaged by, the organizations 205), and features for zero-trust across workforces and supply chains (e.g., business to business supply chains) associated with the organizations 205.

In some examples, the software platform 225 may provide multiple types of security templates and may detect and respond to security incidents by identifying changes in user behavior that may lead to increased security risk for the organization. Additionally, or alternatively, the software platform 225 may provide for automated IT and security operations and one or more connector builders (e.g., no-code flow designers for independent software vendors (ISVs)).

For example, the software platform 225 (e.g., the cloud platform 215-b within the software platform 225) may provide one or more Shared Signals and Events (SSE) publish/subscribe messaging transmitter-receiver connectors (e.g., SSE connectors). In some examples, the software platform 225 may provide the one or more SSE connectors as SDKs (e.g., to be used for development of applications). For example, the software platform 225 may support implementation of an SSE-compatible, scalable, multi-tenant receiver. Additionally, or alternatively, the software platform 225 may support implementation of an SSE stream configuration protocol and may support multiple types of events, such as session-revoked, IP-change, and risk-level-change events. In some examples, the software platform 225 may provide a means of mapping incoming events to user accounts associated with the cloud platform 215-a. Additionally, or alternatively, the software platform 225 may implement heuristics for actions that may be taken by the software platform 225 in response to one or more events being processed. In some examples, the software platform may transmit (e.g., emit) first-party events to a system log, which may be produced by a risk engine based on native user context, first-party risk events, and received third-party events. Additionally, or alternatively, the software platform 225 may provide a web user interface (UI) for administrators (e.g., users of the organizations 205 that may be administrative privileges) to enable streams from supported vendors (e.g., supported ISVs, ISVs associated with applications used within the organizations 205). In some examples, the software platform 225 may provide a mechanism (e.g., a v1 mechanism) for partners (e.g., other organizations that may be associated with one or more of the organizations 205) to integrate with cloud platform 215-a. In such examples, the software platform 225 may correspond to an ecosystem in which developers may use SDKs (e.g., relatively few lines of code) as well as a receiver connector provided by the cloud platform 215-b to integrate with the cloud platform 215-a which may provide a risk engine that may be used with a transmitter connector provided by the cloud platform 215-b within the ecosystem. That is, connectors (e.g., SDKs with relatively few lines of code) provided by the cloud platform 215-b may be used as an interface between the cloud platform 215-b and the cloud platform 215-a. In some examples, by providing such connectors, the software platform may provide for increased internal security and zero-trust products.

Additionally, or alternatively, some connectors may be provided to third parties, for example, to improve performance across a boundaryless workforce. For example, the cloud platform 215-a, the cloud platform 215-b, and third parties may use (e.g., consume) same connectors, which may acts as a connection point between users (e.g., of one or both of the cloud platforms 215) to third parties. Additionally, or alternatively, the connectors may be implemented as SDKs (or open-source code), such that third parties (e.g., partners of the organizations 205, applications) may be included in a zero-trust ecosystem associated with the software platform 225. In some examples, the connectors may enable features provided by the cloud platform 215-b (e.g., SaaS CIAM) to provide identity building blocks to developers building applications (e.g., SaaS applications) using the cloud platform 215-b with zero-trust and improved security. In such examples, the cloud platform 215-b may provide SCIM directory synchronization (e.g., as part of the SaaS CIAM feature) to improve connections between the cloud platform 215-b and the cloud platform 215-a. Additionally, or alternatively, some common SSE connectors may be built within the zero-trust ecosystem. In some examples, the connectors aid in connecting developers (e.g., using the cloud platform 215-b) with organizations (e.g., enterprises using the cloud platform 215-a), and provide for data ingestion unification between the cloud platforms 215.

In some examples, the software platform 225 may provide identity-centric workforce security with zero-trust access controls and automation. For example, the software platform 225 may provide anti-phishing capabilities, passwordless capabilities, and low-code capabilities, which may enable end-to-end identity-security for workforces and supply chains associated with the organizations 205. For instance, the software platform 225 may enable extended workforce and supply chain security for protecting and managing access for non-employee users (e.g., users associated with an organization that may not be an employee of the organization). In some examples, the software platform 225 may provide no-code automation and orchestration for identity management.

In some examples, the software platform 225 may provide features for increased security across multiple types of applications (e.g., the applications 210) including video conferencing applications. For example, the software platform 225 may provide for increased security for video conferencing by verifying caller identities across a video conferencing application (e.g., a video conferencing platform). In some examples, the software platform 225 may provide native integration for the video conferencing application, in which users of the organizations 205 may securely log into a video conference using verification features provided by the software platform 225. In such an example, the software platform 225 may reduce a probability of identity-centric attacks against the organizations 205, for example while users associated with the organizations 205 may be using the video conferencing application. In some examples, the software platform 225 may provide authentication for end-to-end encrypted video conferences, such that the users participating in a video conference may be verified. In such an example, the software platform 225 may provide for improved sign-in experiences (e.g., login experiences) for the video conferencing application, increased security, and passwordless authentication, which may lead to a reduction of password policy updates and reduced password management for the users. That is, the software platform 225 may increase productivity by enabling users of video conferencing applications (or other types of applications) to collaborate by signing into (e.g., securely) the software platform 225 using credentials associated with the software platform 225, which may lead to a passwordless or password-optional experience. Additionally, or alternatively, the software platform 225 may improve identity-centric security by providing end-to-end encrypted video conferencing through verification features, which may reduce administrative burdens associated with managing password policies and complex integrations.

In some examples, identity governance supported by the software platform 225 (e.g., built into the cloud platform 315-a including in the software platform 225) may include lifecycle management, which may correspond to a capability to connect to identity sources (e.g., human resource systems) and use the identity sources as a single source of truth. Additionally, or alternatively, the identity governance supported by the software platform 225 may include, access requests, which may correspond to a request and approval process that enables users associated with the organizations 205 to request and approve access to resources using one or more applications (e.g., common chat based applications). In some examples, the identity governance supported by the software platform 225 may include access certification, which may provide governance policies and audit reporting. Additionally, or alternatively, the identity governance supported by the software platform 225 may include workflows, which may provide capabilities for identity automation and orchestration with low-code or no-code.

In some examples, cloud-native k8 infrastructure access management (e.g., Kubernetes access management) provided by the software platform 225 may include one or more functionalities for deploying and troubleshooting applications running in the cloud-native k8 infrastructure, while complying with organizational security policies. Additionally, or alternatively, the cloud-native k8 infrastructure access management provided by the software platform 225 may provide visibility regarding one or more (e.g., which) cloud-native k8 infrastructure clusters users of the organizations 205 may access, irrespective of whether the users may have previously accessed the cloud-native k8 infrastructure clusters (e.g., as part of onboarding or accessing a cluster deployed in an environment). In some examples, the cloud-native k8 infrastructure access management provided by the software platform 225 may include features for decreasing a quantity of time spent on technical support associated with cloud-native k8 infrastructure access (e.g., aiding developers with a set up for custom wrapper scripts or tools to access cloud-native k8 infrastructure clusters). Additionally, or alternatively, the cloud-native k8 infrastructure access management provided by the software platform 225 may provide for an improved end user experience for authenticating to the cloud-native k8 infrastructure, irrespective of whether a clusters may be deployed (e.g., on a cloud server, a hybrid server, or an on-premises server). In some examples, using the software platform 225 for cloud-native k8 infrastructure access management may provide increase developer velocity by streamlining onboarding and off-boarding processes for developers, a reduced quantity of code and systems which may be authored and maintained by developers for access to the cloud-native k8 infrastructure, a reduced downtime by enabling (e.g., relatively safely) developers to access production Kubernetes infrastructure without violating security policies, improved productivity by enabling the developers to access the cloud-native k8 infrastructure with a single authentication, satisfying internal and external security standards for applications hosted in in the cloud-native k8 infrastructure, and reducing operational overhead for site reliability engineers.

In some examples, privileged access management features supported by the software platform 225 may include privileged access is a service, which may enable customers (e.g., the organizations 205, developers of the applications 210) to achieve compliance and business continuity by securing human, machine, and application access to resources. For example, the customers may be capable of satisfying IAM, IGA, and PAM constraints (e.g., criteria) using the software platform 225 (e.g., a unified, first-to-the-cloud platform for identity). That is, the software platform 225 may correspond to a single, unified platform for IAM, IGA, and PAM for relatively secure access with multiple levels (e.g., any level) of privilege.

In some examples, using the software platform 225 for PAM may enable the organizations 205 to satisfy evolving compliance and security constraints with a cloud-native PAM feature that may be integrated with respective infrastructures of the organizations 205. For example, using the software platform 225, the organizations 205 may implement a zero-trust approach to security. In some examples, the PAM capability supported at the software platform 225 may provide credential vaulting and rotation for local user accounts and human-managed shared secrets, and may provide just-in-time (JIT) access request and approval workflows for human, machine, and application users alike, which may reduce unnecessary standing permissions an attack surface associated with the organizations 205 (e.g., using a least privilege model, a POLP model). Additionally, or alternatively, the PAM capability supported at the software platform 225 may provide privileged access reports and session management capabilities, which may provide an audit trail to detect and prevent unwanted behavior, and to aid in verifying (e.g., proving) compliance. In some examples, the software platform 225 may provide password-less access management using ephemeral certificate-based authorization for multiple types of infrastructures (e.g., multiple types of platforms, networks, or systems). In some examples, a least privilege model may correspond to a model for reducing (e.g., minimizing) a quantity of access to privileged resources at a given time, and reduced elevation of privileges. For example, an relatively high percent (e.g., about 80%) of breaches may target servers. Accordingly, the software platform 225 may contain access to a server by a server administrator. For example, the software platform 225 may refrain from granting some privileges to the server administrator.

In some examples, the PAM capabilities (e.g., features) supported at the software platform 225 may include vaulting and rotation of privileged account credentials, secrets management, sing-sign-on and zero-trust access to infrastructures (e.g., servers, k8s, and managed resources including databases and applications), PAM compliance reporting, PAM access requests and approvals, PAM zero standing privileges and step-up of multi-factor authentication, PAM session recording, PAM session management, cloud infrastructure entitlements management, PAM audits and even logging, and PAM access certifications, among other examples of PAM capabilities.

In some examples, the PAM capabilities (e.g., features) supported at the software platform 225 may include use of an ephemeral credentials-based server access service that may be extended to include a relatively wide range of infrastructure, such as a cloud-native k8 infrastructure and one or more databases. Additionally, or alternatively, the PAM capabilities may include uses a cloud-native vault for shared account password management. In some examples, the PAM capabilities of the software platform 225 may support both a developer requesting access to a cloud-native k8 infrastructure cluster and an administrator requesting root access to perform maintenance changes.

In some examples, the PAM capabilities may be integrated with the identity governance capabilities to support the least privilege model. For example, using the software platform 225, the organizations 205 may implement (e.g., and integrate) multiple tools, including an IAM tool for access, an IGA tool for governance, a PAM tool for privileged resources, and a cloud infrastructure entitlement management (CIEM) tool for cloud entitlements, which may reduce a burden associated with manually integrating such tools. That is, the multiple tools supported at the software platform 225 may enhance security, connectivity, and automation for workforce identity and access management within the organizations 205.

In some examples, the XaaS capabilities supported at the software platform 225 may include human resources as a Source functionality to automate IT processes associated with a user (e.g., an individual) joining, moving within, or leaving the organizations 205. For example, some human resources as a source systems may constrain organizations to use a human resources system with an existing integration network or an on-premises deployment. In some other examples, the XaaS capabilities supported at the software platform 225 may provide human resources as a source capability (or multiple source capabilities) to multiple sources of truth (e.g., any source of truth). For example, the software platform 225 may provide an API, which the organizations 205 may use to send data from a source (e.g., to the software platform 225) and use a human resources system as a source capability included in the software platform 225, such as user confirmation, user matching and linking, profile mappings, and import monitoring, among other examples. In some examples, using the software platform 225 for human resource services may enable users to write custom connectors or leverage workflows to identities from multiple sources.

In some examples, features for phishing-resistance supported at the software platform 225 may determine whether authentication requests may be from an authentic (e.g., correct, suitable) server, thereby providing phishing-resistance for multiple (e.g., all) managed devices and platforms used on devices managed by the organizations 205 and devices unmanaged by the organizations 205 (e.g., using channel binding). For example, an attacker transmit a message (e.g., an email) to a user associated with the organization 205-a and the message may include a malicious link to an unauthentic server (e.g., a spoofed site). In such an example, the user may use the software platform 225 to attempt to log onto the unauthentic server in response to receiving the message. In response, the software platform may stamp a key associated with the unauthentic server, which the attacker may obtain (e.g., intercept). In some examples, the attacker may attempt to use the key provided by the software platform 225 from the unauthentic server on a corresponding authentic server. In such examples, the key may fail. That is, in response to detecting that the server associated with the link is unauthentic, the software platform 225 may perform one or more actions to ensure that the key obtained by the attacker may not be used to access resources associated with the software platform 225 (e.g., protected websites and applications).

In some examples, the passkey (e.g., multi-device web authentication credential) management features supported at the software platform 225 may enable administrators of the organizations 205 to determine to block passkeys for certain groups or users. For example, multi-device web authentication credentials, which may be referred to as passkeys, may provide one or more benefits to end-users including reducing a frequency in which users may enroll or re-enroll accounts, for example if the users are using multiple (e.g., different) devices. In such an example, the multiple devices may store credentials as passkeys. In such an example, the users may use (e.g., recover) the credentials via passkeys. Additionally, or alternatively, Passkeys may enable users to use some devices (e.g., smartphones) as roaming authenticators. In such an example, however, using passkeys may lead to increased security risks for the organizations 205, for example because the credentials may be stored at (e.g., backed-up to) other servers associated with the user (e.g., personal servers, personal clouds, servers unassociated with the software platform 225). Accordingly, the software platform 225 may provide features for preventing the users from using passkeys which may be backed up to servers unassociated with the software platform 225 (e.g., personal clouds).

In some examples, features for web authentication authenticators supported at the software platform 225 may include more granular controls for web authentication authenticators (e.g., passkeys). For example, using the software platform 225 for web authentication may enable respective administrators of the organizations 205 to block (e.g., restrict access to) one or more authenticators (e.g., one or more FIDO authenticators). Additionally, or alternatively, such features may enable administrators of the organizations 205 to initiate web authentication enrollment for respective users (e.g., employees) associated with the organizations 205. For example, the software platform 225 may enable the organizations 205 to restrict web authentication enrollment to hardware keys issued by one or more organizations (e.g., specific organizations) to prevent hardware-based phishing attempts. In some examples, the controls for web authentication authenticators supported at the software platform 225 may include capabilities to allow or block lists of web authentication authenticators and administrator-initiated web authentication enrollment. In some examples, using the software platform 225 for web authentication may enable the organizations 205 to obtain a set of FIDO authenticators (e.g., hardware authenticators), which may automatically enroll users (e.g., employees including new-hires) and may trigger the software platform 225 to transmit a message including keys thereby increasing phishing resistance.

In some examples, a passwordless authenticator for a boundaryless workforce may increase phishing resistant on multiple types of devices and operating systems. Additionally, or alternatively, the passwordless authenticator may be used with the unified access management tools, the identity governance tools, and privileged access capability tools supported at the software platform 225 to provide a passwordless experience for multiple user and multiple resources, including privileged resources.

In some examples, the multi-factor authentication features supported at the software platform 225 may include biometric web login. For example, the software platform 225 may support expanded options for use of biometrics (e.g., face identification, touch identification, fingerprint identification) for an improved passwordless experience for users. Additionally, or alternatively, the multi-factor authentication features supported at the software platform 225 may include enhanced security checks for unmanaged devices, which may support capabilities to perform security posture checks for unmanaged devices and define suitable access policies to enforce the security posture. For example, such in accordance with multi-factor authentication features the software platform 225 may perform one or more verification processes if an application is installed on a device (e.g., a phone, a tablet) of a user associated with the organizations 205, such that the organizations 205 may obtain information associated with a security posture of the device. In some examples, the verification processes may include detecting one or more signals, such as signals that may indicate whether the device may have been jailbroken (e.g., modified to remove restrictions imposed by the manufacturer or operator to allow the installation of unauthorized software), an OS version of the device, whether the device may have a code (e.g., a PIN code) to unlock a lock-screen of the device, and whether disk encryption may be enabled at the device. The software platform 225 may support such verification processes for multiple types of devices and multiple types of operating systems, such as to enable respective administrators of the organizations 205 to build customizable security policies, and understand whether devices used for activities associated with the organization may have updated operating systems, and use PIN codes, among other examples.

In some examples, workflows supported at the software platform 225 may include workflow solution packs, which may aid the organizations 205 (e.g., customers) with identity-based automation by using a bundled collection of customizable (e.g., and prebuilt) templates that are to be used for performing tasks. For example, the workflow solution packs may include templates for capturing contract signatures, account provisioning, device activation, and transmitting notifications across multiple device associated with the organizations 205. In some examples, the workflow solution packs may include security templates, which may enable automation across security operation center processes used within the organizations 205. For example, the security template may enable the software platform 225 to detect and respond to security incidents by identifying changes in user behavior, such as risks that may create a risk to the organization 205. Additionally, or alternatively, the security template may enable the organizations 205 to continuously monitor and improve a respective security posture associated with the organizations 205. That is, the security templates may provide support for respective security operations teams associated with the organizations 205, by providing customizable (e.g., and pre-built) workflows for security awareness, identity automation and response, incident investigation and response, threat intelligence, and user behavior analytics. In some examples, the security templates may provide automations for security policy enforcement at the identity layer, detecting and responding to suspicious user or entity activity by identifying changes in user behavior, such as changes that may create a risk to the organization, and monitoring (e.g., continuous monitoring) of a security posture associated with the organization.

In some examples, one or more connector builders supported at the software platform 225 may provide for building workflows connectors within a no-code flow designer (e.g., supported at the software platform 225). For example, using a connector builder, ISVs (e.g., developers) may build connectors for the organizations 205 (e.g., customers), and respective administrators of the organizations 205 may build connectors to connect custom tools (e.g., to the applications 210). That is, the connector builder may provide for no-code development of workflows connectors in which organizations, ISVs, and developers, among other examples may use workflows to build a connector (e.g., using a drag and drop interface), which may lead to on-demand productized connectors to third party or internal systems with an API available on the public internet. In some examples, the connectors and templates may be used to automate prevention and response use cases to support enhanced security.

In some examples, use of workflows may reduce a time duration used to deploy applications and enable relatively smooth and secure provisioning for privileged accounts, such as system administrators. For example, some users may rely on standard accounts for computer login, email, and other user tasks, that may necessitate logging into separate privileged accounts to perform higher-level administrative tasks. In some other examples, the no-code workflows platform service supported at the software platform 225 may enable the users to perform such tasks using a SSO (e.g., via the software platform 225).

In some examples, verification features supported at the software platform 225 may include features capable of attesting and verifying an identity of a user in an end-to-end encrypted video conference call (e.g., without involving a backend infrastructure used for communications between the software platform 225 and the application in which the video conference call is being performed). In some examples, using such verification features may enable the organizations 205 to create a password-optional or passwordless sign-in experience for end users, which may reduce a quantity of time associated with registration and increase security associated with the sign-in experience as users may obtain relatively stronger authenticators such as possession-based authenticators or biometrics. In some examples, using such authenticators may reduce password management for end user (e.g., including remembering or maintaining passwords through one or more other tools).

In some examples of passwordless onboarding using the software platform 225, a first user (e.g., an IT administrator associated with the organization 205-*a*) may set policies for users to ensure end-to-end passwordless and phishing-resistant access. In such examples, the organization 205-*a* may use the software platform to enroll and onboard a second user (e.g., an employee of the organization 205-*a*) with zero passwords. Additionally, or alternatively, a third user (e.g., a contractor of the organization 205-*a*) may use the software platform 225 to obtain secure access to resources associated with the organization 205-*a*. In some examples, the third user may login and begin downloading files (e.g., media files) from a resource associated with the application 210-*a*. In such an example, the application 210 may detect the activity and use workflows (e.g., setup by the organization 205-*a* using the software platform 225) to notify the software platform 225. In such an example, the software platform 225 may suspends access of the third user (e.g., suspend the third user's session) to the application and one or more other applications the third user may have access to.

Additionally, or alternatively, the software platform 225 may transmit and indication of the event to one or more users (e.g., a security operations team) associated with the organization 205-a or one or more other organizations.

In some examples, the second user (e.g., an employee that may be part of a security operations team) may receive the indication of the event from the software platform 225 (e.g., via a client device). In such an example, the second user may perform forensics of the infrastructure the third user may have accessed. In some examples, to perform the forensics, the second user may request access to a server via the software platform 225. In such examples, the software platform 225 may transmit a request to a fourth user (e.g., a manager) associated with the organization to approve or deny the request of the second user. In some examples, in response to the fourth user approving the resource of the second user, the software platform 225 may transmit a link to a secure shell to the second user, which the second user may use to perform the forensics. In some examples, the software platform 225 may record a session used by the first user to perform the forensics with an audit trail. Additionally, or alternatively, given that the application 210-a may use (e.g., may be deployed using, may be integrated with) the software platform 225, the event (e.g., a security incident) may trigger an access certification campaign to be review access to the application 210-a by the third user. In such an example, the first user may review the event driven certification campaign, which may identify details associated with the access of the third user including a time instance during which the application 210-a may have be access, a time instance during which access to the application may have been granted to the third user, a time duration during which the third user last used the application 210-a, and other information associated with the event. Techniques for unifying multiple identity clouds, as described herein, may provide one or more capability to improve a performance associated with ISVs, IT vendors, and employees, among other examples.
add:

In some examples, the software platform 225 may support a single selection configuration option (e.g., push button), which may be referred to as a one-click configuration, within the cloud platform 215-b. For example, after developers may build a resource (e.g., a website, application, identity feature, security feature) using the cloud platform 215-b, the developers may determine to integrate the resource (e.g., publish the application to) the cloud platform 215-a. In such an example, the developer may use the one-click to synchronize metadata from cloud platform 215-b (e.g., a process used to build the resource) with the cloud platform 215-a (e.g., a marketplace with public applications), for example without providing information to the cloud platform 215-a or the cloud platform 215-b (e.g., without completing forms within the cloud platform 215-a, such as using an integration network manager). In some examples, such a process may reduce complexities and increase a rate of development for ISVs (e.g., and integration network operations). In some examples, synchronization between the cloud platform 215-b and the cloud platform 215-b using the one-click may be performed for multiple types of applications, such as private applications that may be built externally from the cloud platform 215-b. In such examples, ISVs may share configured applications with automatic metadata synchronization between the cloud platform 215-b and the cloud platform 215-b using the one-click configuration. In some examples, the one-click configuration may be accessible via a dashboard (e.g., an administered dashboard) provided by the software platform 225.

For example, the software platform 225 may support super federation, in which the software platform 225 may provide improved SAML with the one-click configuration (e.g., one-click federation). For example, some techniques for implementing (e.g., onboarding) applications and enabling SSO for the applications may be relatively challenging and error prone. For instance, some configuration screens in the applications may be relatively complex and use SAML, assertion customer service uniform resource locators (ACS URLs), signing certificates, name identifiers, and claim mapping, among other examples. In such an example, administrators onboarding such applications may use an increased quantity of time copying and pasting information from multiple (e.g., different) documents to satisfy constraints of the application (e.g., signing certificates, name identifiers) in an attempt to configure SSO. Additionally, or alternatively, such information may be updated in response to an integration changing or being updated. In some examples, ISVs may provide guidance to their customers on how to integrate applications with identity providers, such as the software platform 225.

In some other examples, using the one-click configuration supported at the software platform 225, ISVs may automate the configuration of an identity provider using reduced (e.g., minimal) user input. For example, using the software platform 225, the ISVs may begin a registration process based on an email address associated with the user (e.g., using a tool provided by the software platform 225 for attaching information to an email address or other online resources) or by requesting the user to enter a FastFed Discovery Endpoint. In such an example, in response to beginning the registration process an IT administrator (or other user associated with the organization) may be redirected to the associated identity provider (e.g., the software platform 225), which the IT administrator may use to confirm the registration process. In some examples, after completing the registration process, resources may be created (e.g., the application may become integrated into the software platform 225 and the software platform 225 may become registered as the identity provider. In such an example, a connection (e.g., a communication channel) may be established for use in signing key rotation and other (e.g., future) scenarios. In some examples, the software platform 225 may support safer shadow IT. For example, configuring SSO may, in some examples, be performed by the IT administrator, which may lead to one or more issues, for example if an application has not been onboarded. In some examples, the IT administrator may use a free-tier or on a trial account to configure SSO, which may lead to one or more security risks. Additionally, or alternatively, the company may lack visibility of applications used by the employees.

In some other examples, the IT administrator may use the software platform 225, which may serve as an identity provider that ISVs may integrate with. For example, using the software platform 225, employees of the company may use corporate credentials to sign up to applications for use. Additionally, or alternatively, using the software platform 225, the IT administrator may track the applications the employees use and select applications to onboard. In some examples, the software platform 225 may generate reports and output the reports to the IT administrators. In some examples, the reports may provide insights regarding applications used by the employees. Additionally, or alternatively, the IT administrator may use the software platform 225 to codify some of the company policies to manage types of applications that may be used (e.g., a self-service context). For example, the IT administrator may use the software platform 225 to constrain access to applications to applications which may comply with one or more standards (e.g., applications which may be SOC2 compliant). That is, in some examples, the software platform 225 may correspond to a single, global identity provider which may provide one or more enhancements for ISVs, and IT administrators, among other examples.

Additionally, or alternatively, the software platform 225 may support SAML and a system for cross-domain identity management (SCIM) using the one-click configuration and provisioning. For example, the software platform 225 may provide an extension of SAML in one-click in which the software platform 225 may provision users and groups to an application (e.g., a SaaS application) In some examples, the extension of the SAML may also provide for SCIM for provisioning (e.g., which may be part of one or more specifications, such as FastFed specifications). In some examples, the one-click configuration and provisioning may enable IT administrators (e.g., or other users associated with an organization) to enable SSO for user and automate provisioning and deprovisioning (e.g., of the applications or resources within the applications) to the users (e.g., single users or groups of users). In some examples, the software platform 225 may be used as an identity graph. For example, some ISVs may refrain from (or may be incapable of) using an identity provider to add users and groups to application. For example, the ISVs may use a synchronization process or choose to query the identity provider (e.g., in real time) to avoid using a local copy of the data (e.g., and managing synchronization and conflicts). In such examples, the ISVs may use the software platform 225 (e.g., the one-click configuration supported by the software platform 225), which may enable the ISVs to request read access to a directory of the organizations. In such an example, the ISVs may query users and groups using a graph API (e.g., via the software platform 225). Additionally, or alternatively, the software platform 225 may include endpoints, which may provide the ISVs with a stream of changes that may be used during the synchronization process. For example, the ISVs may use the stream (e.g., data) for features (e.g., a people picker).

In some examples, the software platform 225 may support a marketplace in which ISVs that use the software platform 225 may offer advanced capabilities (e.g., as part of applications) to users (e.g., in the marketplace). For example, a user may use an application (e.g., a SaaS application) from the marketplace. In such an example, IT administrators may be capable of installing applications from within the marketplace. In some examples, the installation may establish a connection (e.g., a channel) to the application. For example, the connection may occur between an account within the application and the directory associated with the organization. In some examples, the software platform 225 may provide subscription and license management features which may integrate with one or more IGA capabilities, including future IGA capabilities. In some examples, in response to installing an application the IT administrator may be provide an option to connect to the software platform 225 (e.g., may be provided with the one-click configuration).

In some examples, to use one or more features supported by the software platform 225, the ISVs may be constrained to support and maintain standards (e.g., FastFed standards), SAML, and SCIM. Additionally, or alternatively, as FastFed adoption increases, the ISVs may create and maintain and increased quantity (or different) integrations with multiple identity providers. In such examples, the ISVs may use the cloud platform 215-b, which may enable FastFed, SAML, and SCIM to be transparent for the ISVs. For example, the ISVs may integrate applications with the cloud platform 215-b and use one or more authentication and management SDKs (e.g., provided by the cloud platform 215-b). In such an example, the cloud platform 215-b may implement FastFed standards, integrate with SAML, and support inbound SCIM provisioning. In some examples, the software platform 225 may provide one or more resources for multi-tenant SaaS applications. For example, the software platform 225 may combine the cloud platforms 215 to provide capabilities, such as the marketplace in which users may install applications (e.g., trial or purchase) with SSO or provisioning, or both. In some examples, the marketplace may provide a framework for certifying enterprise readiness qualities.

In some examples, the software platform 225 may support SAML and OIDC as well as standardize protocols for identity providers. Additionally, or alternatively, the software platform 225 may reduce friction associated with onboarding (e.g., customer acquisition), reduce password management or recover flows for the organizations 205, and may enable the organizations 205 to delegate account management and multi-factor authentication to the software platform 225. In some examples, the software platform 225 may enable users (e.g., end-users) to self-serve SSO applications, reduce thread of account takeover, reduce credential reuse or leaks, enable enforcement of multi-factor authentication for non-IT managed applications, reduce security events, and provide visibility of shadow IT by providing information associated with applications used by employees. In some examples, the software platform 225 may reduce friction for enterprise adoption of SaaS applications (e.g., increased licenses) reduce support costs for SSO, an increase security (e.g., reduce liability) for SaaS applications (e.g., no passwords). Additionally, or alternatively, the software platform 225 may support relatively seamless (e.g., zero downtime) upgrades for applications and enable automated workflows for scalability. In some examples, the software platform 225 may support a mapping for enterprise ready features, differentiation from competitors, and reduce a barrier associated with adoption of applications by relatively large organizations. Additionally, or alternatively, the software platform 225 may support governance and security controls for self-service adoption, scalability of security controls and enforcement, and reduce manual steps in security management. In some examples, the software platform may support increased adoption or engagement and "stickiness" by enabling employees to collaborate with teams and companies and enable ISVs to obtain information from organizations using the applications without identity provider pushes. Additionally, or alternatively, the software platform 225 may support fine-grained delegation of an enterprise directory to applications (e.g., which may be auditable). In some examples, the software platform 225 may promote funnel conversion to paying customers and integrating billing and procurement.

For example, the software platform 225 may enable organizations to obtain SSO SaaS applications and provisioning from the cloud platform 215-a, a capability to sign-in with the software platform 225, enterprise takeover of self-service applications, enterprise polity, and the marketplace (e.g., try or buy). Additionally, or alternatively, the software platform 225 may support a control plane API for identity providers and service providers for SSO and provisioning configuration (e.g., including SAML or OpenID Connect and SCIM). In some examples, the software platform may enable setup with configuring (e.g., prior configuration) or trust between the identity provider and service provider parties. Additionally, or alternatively, the software platform may support identity provider or service provider flows for handshake.

Figure 3:
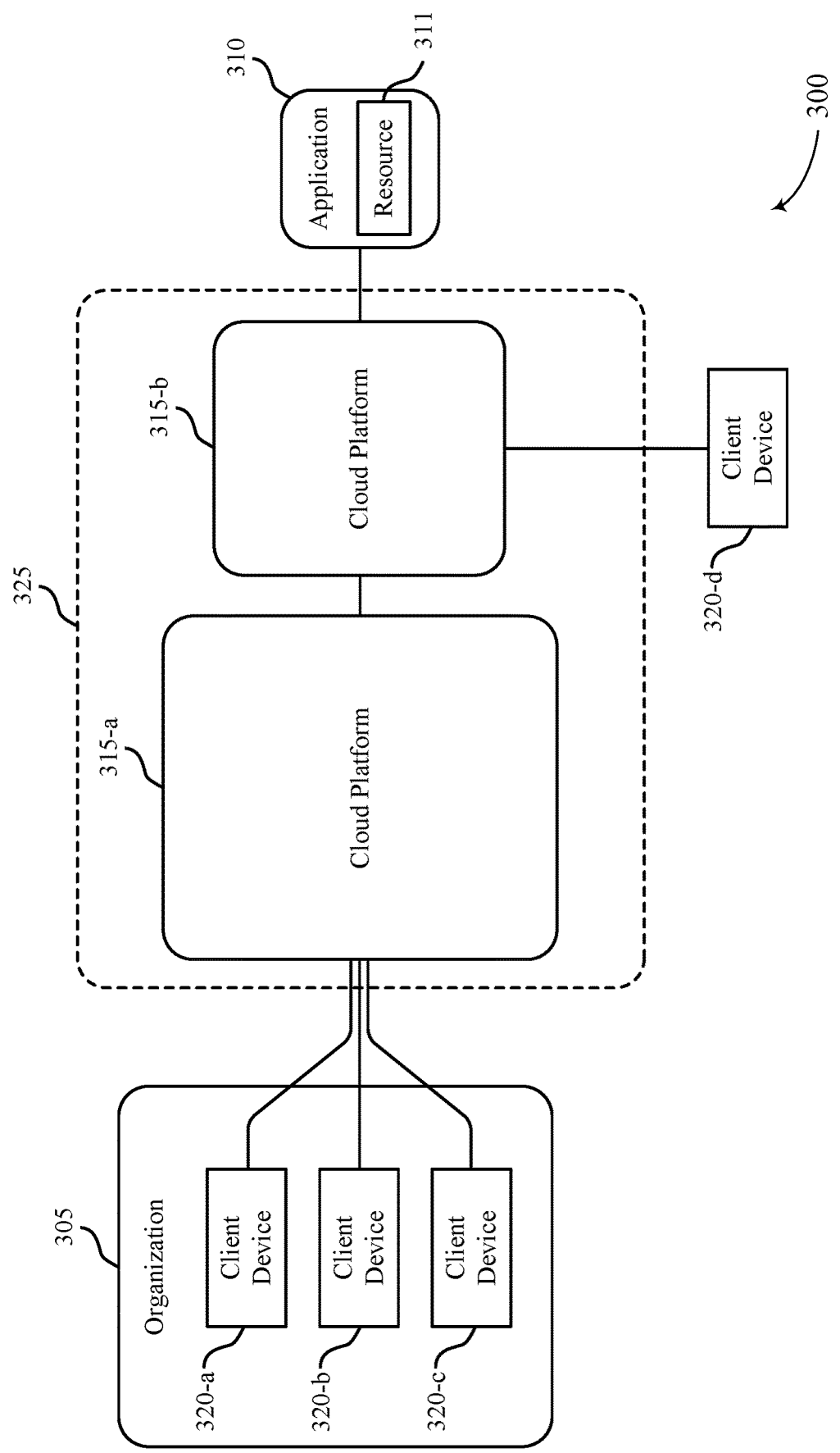

FIG. 3 illustrates an example of a block diagram 300 that supports techniques for unifying multiple identity clouds in accordance with aspects of the present disclosure. In some examples, the block diagram 300 may implement or be implemented by aspects of the system 100 and the block diagram 200. For example, the block diagram 300 may be implemented at a software platform 325, one or more cloud platforms 315 (e.g., a cloud platform 315-a, a cloud platform 315-b), one or more client devices 320 (e.g., a client device 320-a, a client device 320-b, a client device 320-c, a client device 320-d), or any combination thereof, which may be examples of the corresponding entities as described with reference to FIGS. 1 and 2.

In some examples, an organization 305 may use the software platform 325 to manage resources across multiple identity clouds. For example, the software platform 325 may provide a framework in which organizations may request access to resources across an increasing quantity of software applications with reduce complexity while maintaining security and compliance. For instance, the software platform 325 may provide one or more services for developers to build (e.g., and deploy, such as via the cloud platform 315-b) software applications and provide services for organizations (e.g., the organization 305) consuming those applications (e.g., via the cloud platform 315-b), thereby providing an improved experience for interactions between developers and organizations. That is, users (e.g., employees of the organization 305, developers of the application 310) may use the software platform 325 to access the cloud platform 315-a (e.g., a workforce identity platform) and the cloud platform 315-b via a client device (e.g., the client device 320-a, the client device 320-b, the client device 320-c). For example, using the client devices 320, users may interact with a dashboard associated with the software platform 325 which may include one or more features including customer identity, workforce identity, a marketplace, a partner portal (e.g., a portal in which ISVs may deploy (e.g., publish) extensions to the marketplace), an access gateway, server access, authorization, account management (e.g., a portal for managing access requests, an inbox), and an identity grid (e.g., an identity control plane to enable developers and administrators of organizations to manage resources across the cloud platform 315-a and the cloud platform 315-b), among other possible features.

As illustrated in the example of FIG. 3, a developer may use the cloud platform 315-b to build the application 310 and publish the application 310. In some examples, the application 310 may be an example of an application (e.g., a super application) which may include multiple integrations (e.g., a full level of integrations) including SSO provisioning of user accounts, and fine-grained entitlements, among other examples of integrations. For example, the developer (e.g., via the client device 320-d and using a first one or more credentials) may transmit a request the software platform 325 to access the cloud platform 315-b. The software platform 325 may authorize access to the cloud platform 315-b based on the first one or more credentials satisfying a threshold. In response to receiving access to the cloud platform 315-b, the developer may use the cloud platform 315-b to build code for the application 310. In some examples, the developer may use predefined (e.g., predetermined) code provided by the cloud platform 315-b. Additionally, or alternatively, the developer may use the software platform 325 to integrate the application 310 into the cloud platform 315-b for use within the cloud platform 315-a. In some examples, the developer may use the dashboard associated with the cloud platform 315-b to build (e.g., select, customize) an authorization model, which the software platform 325 may use to determine whether users of the application 310 may obtain access to the application 310 (e.g., and resources within the application 310, such as a resource 311). In some examples, the authorization model may include a uniform data model and configuration language for expressing a relatively wide range of access control policies from multiple client services (e.g., hundreds of client services). In some examples, the authorization model may include multiple (e.g., different) policies for multiple (e.g., different) resources within the application 310. For example, the developer may assign access constraints (e.g., per resource or per multiple resources) for a user, a set of users (e.g., teams), or organizations (e.g., companies). In some examples, the authorization model may identify whether one or more users may edit or view (or both) resources within the application 310.

In some examples, the developer may use the software platform 325 to publish (e.g., deploy) the application 310 to the marketplace. In some examples, the developer may publish one or more other types of actions to the marketplace. For example, the developer may publish a social connection, SSO interactions, log streams, a short messaging service (SMS) provider, among other types of actions. In some examples, as part of publishing the application 310 to the marketplace (e.g., for use by users via the cloud platform 315-a) the developer may select one or more resources associated with the application for which users may be capable of requesting access. For example, the developer may enable users to request access to the resource 311.

In such an example, users associated with the organization 305 may use the software platform 325 to request access to the application 310 (e.g., and the resources 311 within the application 310) via the cloud platform 315-a. For example, a first user may transmit a request (e.g., via the client device 320-a and using a second one or more credentials) to the software platform 325 to access the cloud platform 315-a. The software platform 325 may authorize access to the cloud platform 315-a based on the second one or more credentials satisfying a threshold. In some examples, in response to the first user obtaining access to the cloud platform 315-a, the first user (e.g., an IT administrator) may install the application 310 from the cloud platform 315-b to a portal within the cloud platform 315-a that may be associated with the organization 305. In some examples, the portal may include resources (e.g., any resource) that may be access by users associated with the organization 305.

In some examples, a second user (e.g., a marketing lead associated with the organization 305) may transmit a request (e.g., via the client device 320-b and using a third one or more credentials) to the software platform 325 to access the cloud platform 315-a. The software platform 325 may authorize access to the cloud platform 315-a based on the third one or more credentials satisfying a threshold. In response to the second user obtaining access to the cloud platform 315-a, the second user may request access to the application 310. For example, the second user may use the portal associated with the organization 305 to determine whether the application 310 may be available to the second user, such that the second user may request to access the application 310. In some examples, access to the application 310 by the second user may be based on the authorization model determined by the developer of the application 310. In some examples, the request from the second user may trigger the software platform 325 to transmit an indication (e.g., a notification, such as via an instant messaging program) of the request to the first user. In some examples, the software platform 325 may transmit the request in accordance with an identity governance feature associated with the software platform 325. In such examples, the first user may receive the notification and approve or deny the request. In some other examples, the software platform 325 may approve the request based on or more other criteria that may be determine using the identity governance feature. The second user may use the portal to determine whether the request to access the application was authorized.

Additionally, or alternatively, a third user (e.g., a marketing designer) may transmit a request (e.g., via the client device 320-c and using a fourth one or more credentials) to the software platform 325 to access the cloud platform 315-a. The software platform 325 may authorize access to the cloud platform 315-a based on the fourth one or more credentials satisfying a threshold. In response to the third user obtaining access to the cloud platform 315-a, the third user may request access to the resource 311 within the application 310. For example, the third user may use the portal associated with the organization 305 to determine whether the application 310 and the resource 311 may be available to the third user, such that the third user may request access the application 310. In some examples, access to the resource 311 by the third user may be based on the authorization model determined by the developer of the application 310. In some examples, the third user may receive automatic approval to access the resources 311 through an authorization process associated with the software platform 325.

In some examples, the organization 305 may use the cloud platform 315-a (e.g., a workforce identity cloud) to improve employee experience, and protect the organization 305 (e.g., a company) from cyber-attacks that may target employee credentials. For example, the organization 305 may have obtained (e.g., acquired) another organization. In such an example, the organization 305 may determine to integrate one or more technology stacks associated with the organization 305 with one or more technology stacks associated with the obtained organization, which may increase a susceptibility of the organization 305 to cyber-attacks, such as phishing attacks in which an attacker may attempt to obtain credentials, such as passwords and usernames, from the organization 305. In some examples, to aid in protecting the organization 305 from cyber-attacks, the organization 305 may determine to use the software platform 325 as an identity provider, such that the organization 305 may refrain from using passwords. For example, the software platform 325 may include one or more features within the cloud platform 315-a, which may enable the organization 305 to access multiple types of resources via a passwordless login. For example, a user associated with the organization 305 may access (e.g., log into) multiple applications using a fingerprint (or another type of credential other than a password) associated with the user (e.g., via the client device 320-a). That is, the user may use the fingerprint (e.g., via the client device 320-a) to log into the software platform 325, such that the user may access multiple applications, among other types of features. For example, in response to logging into the software platform 325, the user may access an email account associated with the user.

In some examples, the software platform 325 may include one or more features capable of detecting phishing attacks (or one or more other types of cyber-attacks) associated with resources (e.g., the application 310, the resource 311) managed at the software platform 325. For example, an attacker may use a phishing campaign email to attack the user (e.g., and one or more other users associated with the organization 305) as part of an attempt to obtain access to privileged information. In such an example, the user may receive a first email that may include a link (e.g., a hyperlink, a digital reference to data that the user may follow or be guided to by clicking) to a website. The user may select (e.g., click) the link to access the website. In some examples, in response to clicking the link (e.g., via the client device 320-a), the user may receive a second email. For example, the software platform 325 may transmit a message (e.g., the second email) to the user indicating that the first email may be associated with a phishing attack and that the software platform 325 may have blocked access to the link by the user. That is, irrespective of the user clicking the link associated with the phishing attach, the software platform 325 may have detected the phishing attack and, in response, may have blocked the phishing attack (e.g., blocked access to the link such that the phishing attack may be prevented). In some examples, using a fingerprint to log into the software platform 325 may aid in preventing phishing attacks, for example, by excluding passwords which the phishing attack may be attempting to obtain. Additionally, or alternatively the software platform 325 may perform a domain check and verify whether a requesting website (e.g., associated with the link) may be authentic. In some examples, the software platform 325 may block a website in response to detecting that the website is unauthentic (e.g., fake). In some examples, the software platform 325 (e.g., a unified platform) may include security actions (e.g., which may be determined by the organization 305 using the cloud platform 315-a), in which a workflow may be triggered in response to detection of the phishing attack. For example, in accordance with the workflow, the software platform 325 may transmit a message to one or more other users associated with the organization 305 (e.g., a security team) which may indicate, to the one or more users, that the phishing attack occurred. Additionally, or alternatively, the message may indicate first information associated with the phishing attack (e.g., an internet protocol address associated with the phishing attack) or second information associated with actions to be performed in response to the phishing attack, or both. In some examples, in response to detecting a phishing attack associated with the organization 305, the software platform 325 may indicate (e.g., share) the first information or the second information (or both) to other organizations which may use the software platform 325. That is, the software platform 325 may share information (e.g., signals) associated with events (e.g., the phishing attacks, other types of cyber-attacks) across the software platform 325 (e.g., the identity network) to increase insights and action. That is, if the software platform 325 detects a security-event associated with an organization (e.g., a customer) the software platform 325 may use information associated with the security-event to increase security across multiple (e.g., all) organizations using the software platform 325. For example, the software platform 325 may block the IP addresses associated with the phishing attack (e.g., a malicious internet protocol address) across multiple (e.g., different) users across multiple (e.g., different) organizations.

In some examples, the software platform 325 may be capable of securely provisioning and deprovisioning access to applications (e.g., privileged applications). For example, the application 310 may be an example of a ticketing platform used at the organization 305 to manage and delegate tickets (e.g., tasks) to users (e.g., engineers, employees). In such an example, the application 310 may transmit a request to a first user (e.g., via the client device 320-a) indicating a ticket may have been assigned to the first user. In some examples, the ticket may identify a problem (e.g., an issue) associated with another entity (e.g., application, system, network) associated with the software platform 325. For example, the ticket may indicate an issue with a cloud-native k8 infrastructure node (e.g., a Kubernetes node). In response to receiving the indication of the ticket, the first user may update a status associated with the ticket (e.g., via the client device 320-a). In some examples, in response to the status of the ticket being updated, and based on the first user being logged into the software platform 325, the software platform 325 may transmit an indication of a request for access by the first user to the other entity (e.g., the cloud-native k8 infrastructure), such that the first user may address the issue identified by the ticket. For example, the software platform 325 may transmit the indication of the request to a second user associated with the organization 305 (e.g., via the client device 320-b). In some examples, the second user may receive the indication and approve or deny the request. That is, the software platform 325 may include features for automating provisioning and deprovisioning and supporting identity governance flows, such as managing access requests and certifications. For example, in response to the first user updating the status of the ticket (e.g., to active or another suitable status), the software platform 325 may (e.g., automatically) trigger transmission of the corresponding access request. In some examples, the first user may update the status of the ticket from active to another status, such as closed (or another suitable status). In such an example, the software platform 325 may (e.g., automatically) revoke access of the user to the other entity. That is, the software platform 325 may enable the first users with access (e.g., privileged access) for a duration used by the first user to perform (e.g., and complete) the work, such as work associated with the request. For example, using the software platform 325 may enable the organization 305 to improve employee experience by enabling passwordless login to multiple resources, blocking cyber-attacks, automating incident responses, and securely managing user access and requests to applications (e.g., privileged applications).

In some examples, a developer of the application 310 may use the cloud platform 315-b (e.g., via the client device 320-d) to build the application 310. For example, the developer may seek a balance between security, convenience, and innovation for the application 310. In such an example, the software platform 325 may enable the developer to achieve the balance by enabling the developer to build a custom stack for connecting applications (e.g., the application 310) to a relatively diverse ecosystem of suitable identity providers and capabilities.

In some examples, a user profile may determine what a user may view and edit within the application 310. In such examples, the software platform 325 may increase the user experience by enabling the user to log into the user profile with reduced complexity across multiple devices while maintaining security. In some examples, using the software platform 225, the developer may increase innovation by reducing a quantity of time used for maintaining standards compliance and security patches associated with maintaining security of the application 310.

In some examples, compromised passwords and forged credentials may lead to one or more security risks. For example, login boxes may be used to moderate access to a shared computer resource. Some login boxes may include multiple (e.g., two) for fields, such as a username and password (e.g., with reduced constraints regarding the password). In some examples, passwords of users may be stored in a table of a database associated with the website (e.g., as plain text). In some examples, if the passwords are used to protect resources such as finances, utilities, and official documents, password compromises may have relatively severe consequences for both the user and the entity (e.g., business) managing access to the resource. Accordingly, secure user logins may be associated with one or more complexities, such as password constraints (e.g., alphanumeric, upper case, lower case, special character, requests to change passwords monthly). However, implementing such authentication complexities may be relatively difficult and lead to passwords reuse across multiple websites. In some examples, password reuse may increase a value of passwords and lead to user credentials being a target of a hack or a breach. For example, attackers may obtain a list of email addresses and breached passwords to gain unauthorized access to user accounts. That is, passwords may lead to security risks. For example, passwords may be insufficient in securing an identity of a user. Accordingly, to increase security, some organizations may use multi-factor authentication. In some examples, however, multi-factor authentication may reduce a user experience of an application and therefore may be insufficient.

In some examples, however, the software platform 325 may use platform authenticators for securing user identity (e.g., at scale). For example, web authentication authenticators may use hardware of devices and biometrics to increase security. For instance, the software platform 325 may use web authentication in combination with device biometrics to reduce login complexities and enable user authentication with security chips built into the devices. In some examples, using web authentication in combination with device biometrics may provide a web authentication method that is phishing resistant.

In some examples, while using web authentication with device biometrics may support the passwordless adoption blockers, it may be bound to a device. For example, devices may be provisioned individually and transitioned, for example if the user changes (e.g., upgrades) devices. In some examples, to support passwordless authentication across multiple devices and across multiple platforms, the software platform 325 may use passkeys.

For example, the application 310 may correspond to a streaming service, which may be configured to authenticate users with username and password. In such an example, a developer may use the cloud platform 315-b (e.g., via the client device 320-d) to update authentication capabilities for the application 310. The user may transmit a request to enable passkeys, for example using a database connection associated with the application 310. In such an example, the application 310 may include features in which users may create a passkey. For example, the cloud platform 315-b may update code associated with the software platform to include code which may enable the application 310 to detect whether a device of a user is capable of passkey use. In such an example, if the application 310 detects that the device of the user is capable of passkey use, the application may request that the user create a passkey (e.g., using a biometric ceremony). For example, a textbox (e.g., a username field) associated with the sign in may include an autocomplete attribute (e.g., an autocomplete tag) that indicates, to a browser and operating systems used by the user, to use a passkey. Accordingly, the user may sign into the application using a fingerprint sensor (or another type of biometric). In such an example, the user may use a same flow for authentication across multiple devices that use a same account (e.g., an account associated with the passkey).

Additionally, or alternatively, the cloud platform 315-b may provide extensibility points throughout the authentication process, which we refer to as an identity pipeline. For example, the cloud platform 315-b may enable users to deploy custom code, which may be referred to as actions, to provide the user with a customizable experience and enable the developer to provide a custom user experience. For example, the developer of the application 310 may use using actions and the cloud platform 315-b to manage access to resources (e.g., the resources 311, a streaming content library) within the application 310.

The developer of the application 310 may be constrained by regional regulations and copyright laws. Accordingly, the developer may wish to block users located in countries in which a company associated with the developer of the application 310 may not conduct business. Additionally, the developer may wish to control content users may be authorized to stream based on their location. In some examples, actions supported at the software platform 325 may enable developers to customize and extend points of the identity flow. For example, the developer may use a no-code solution provided by the software platform 325 (e.g., using a marketplace) or the developer may write and run custom code. In some examples, coding using the software platform 325 may be performed using a serverless environment that may test, debug, and version the actions (e.g., directly from within a browser). In some example, the developer may block logins from a particular country or use an action that restricts access to users by country, or both.

In some examples, the developer may use the software platform 325 to customize the content available within the application 310 based on information included in a user profile and a location of the user upon sign-in. For example, the developer may create a custom action (e.g., may write code using Javascript or Node) to manage the user profile and enrich an identifier token with a custom claim. In some examples, with some sets of SDKs (e.g., SDKs provided by the software platform 325), the developer may use information from the user profile to define content the user may access. In some examples, the software platform 325 may include a library from which the developer may create an action. Additionally, or alternatively, the developer may use the library to define a trigger and runtime associated with the action. The developer may deploy (e.g., add and apply) the action to the login flow associated with the application 310. In some examples, the developer may use one or more capabilities supported by the software platform 325 to manage authentication based on group pricing, account partnerships with internet providers, and account tiering, among other examples. In some examples, actions and extensibility points provided by the software platform 325 may enable developers to support and connect to diverse, hybrid environments.

In some examples, the software platform 325 may improve customer identity for developers by supporting identity and security standards to increase security for customers and end-users. For example, using the software platform 325, the cloud platform 315-b may be called by the application 310, which may be hosted using one or more cloud servers. Additionally, or alternatively, the software platform 325 may provide security to other severs developers may use to build and run code. For example, the software platform 325 may provide for reduced security risk for developers by providing an enterprise-grade identity platform.

In some examples, the software platform 325 may be associated with one or more other platforms, such that the software platform 325 may provide customer identity capabilities with the cloud platform 315-b, which may be used by developers to build applications. Additionally, or alternatively, the software platform 325 may support decentralized identity. That is, the software platform 325 may support identity standards and passkeys increase protections for customer identity, may support integration of user profiles into business services, and may be associated with (e.g., partner with) cloud providers to increase customer identity for developers, irrespective of a framework used to develop the applications or where code associated with the application may be run.

In some examples, the software platform 325 may support verifiable credentials. For example, using the cloud platform 315-b, the software platform 325 may be capable of obtaining and verifying credentials. In some examples, the software platform 325 may use SDKs that may be integrated into applications hosted using the cloud platform 315-b. For example, the application 310 (e.g., the developer of the application 310) may use a verifiable credential, however, the application 310 may be incapable of identifying the verifiable credential. In such an example, the application 310 may transmit a request to the software platform 325 for a verifiable credential. The request may include one or more parameters (e.g., countries or hospitals which a vaccine registration may be associated with). In response to the request, the software platform 325 may provide the application 310 with a verifiable credential that may satisfy the one or more parameters. That is, the software platform 325 may create a protocol request (e.g., for a wallet) which the software platform 325 may use to obtain parameters associated with the application 310 and use the parameters to generate a protocol. In some examples, the software platform 325 may provide the application 310 with a link to a wallet that may satisfy the parameters. In some examples, the software platform 325 may include APIs that obtain the request for the verifiable credentials (e.g., for the protocols) from applications, such as the application 310, which may be hosted outside of the cloud platform 315-b. In some examples, the software platform 325 may include a framework for combining credential data and may support a credential builder using the combined credential data.

In some examples, verifying traditional credentials may be relatively time consuming, and provide reduced security. For example, images may be obtained or fabricated of the credentials. In some examples, verifiable credentials may be used in which users in possession of verifiable credentials may present them to a requestor. In such an example, the verifiable credential may be verified by the requestor (e.g., instantly). In some examples, a user may complete a course to obtain a verifiable credential, which the user may store in a digital wallet. In some examples, the developer may use the software platform 325 to configure the application 310 as a credential issuer. In such an example, the developer may use the cloud platform 315-b to create a credential template. The developer may provide some information about the template to describe a purpose associated with the template. Additionally, or alternatively, the developer may brand the template accordingly, such that user who receive the template may determine that the template is associated with the application 310. In some examples, the developer may use the software platform 325 to issue the template. For example, to use the template, the developer may use the software platform 325 to configure an actions sequence and enable one or more settings (e.g., associated with use of the template).

Figure 4:
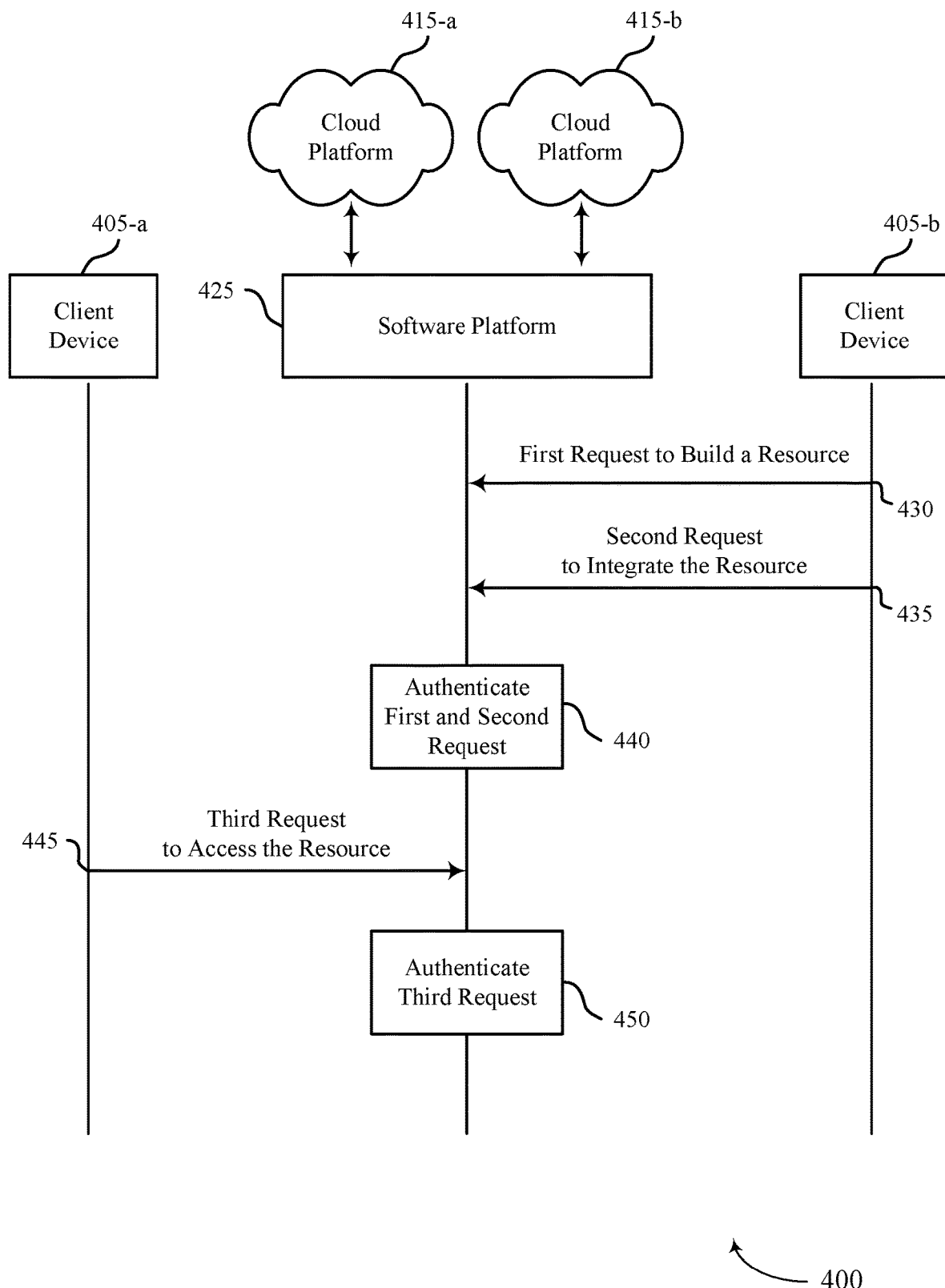
FIG. 4 illustrates an example of a process flow that supports techniques for unifying multiple identity clouds in accordance with aspects of the present disclosure.

FIG. 4 illustrates an example of a process flow 400 that supports techniques for unifying multiple identity clouds in accordance with aspects of the present disclosure.

In some examples, the process flow 400 may implement aspects of the system 100, the block diagram 200, and the block diagram 300. For example, the process flow 400 may illustrate operations between a software platform 425, a client device 405-a, and a client device 405-b, which may be examples of a subsystem 125 and a client device 105, respectively, as described with reference to FIGS. 1 through 3. The process flow 400 may be implemented at the software platform 425, the client devices 405, or both. In the following description of the process flow 400, the information communicated between the software platform 425 and the client devices 405 may be performed in different orders or at different times than shown. Additionally, or alternatively, some operations may be omitted from the process flow 400 and other operations may be added to the process flow 400.

At 430, the software platform may receive a first request from a first user (e.g., via the client device 405 b) to build a resource. The first user may be an example of a developer as described throughout the present disclosure, including with reference to FIGS. 2 and 3. For example, the first user may use the cloud platform 415-b to build the resource. In some examples, as part of the first request, the first user may build (e.g., request to build) an authorization model for the resource using the cloud platform 415-b, which may be associated with the software platform 425. The authorization model may be an example of an authorization model as described throughout the present disclosure, including with reference to FIGS. 2 and 3. For example, the authorization model may identify one or more parameters associated with accessing the resource using the cloud platform 415 b.

At 435, the software platform 425 may receive, from the first user, a second request to integrate the resource with the cloud platform 415-a in accordance with the authorization model. For example, the first user may request to publish the resource on marketplace (e.g., integration network) included in the cloud platform 415-a. In some examples, as part of the second request, the first user may use a one-click configuration, which may be an example of a one-click configuration as described throughout the present disclosure, including with reference to FIG. 2. For example, the first user may use the one-click configuration to synchronize metadata from cloud platform 415-b (e.g., a process used to build the resource) with the cloud platform 415-a (e.g., the marketplace with public applications).

At 440, the software platform 425 may authorize the first request and the second request using a directory associated with the software platform 425. For example, the software platform 425 may authorize the first request based on a first credential associated with the first user. in such an example, the software platform 425 may authorize the second request based on the authorization of the first request. That is, the first user may submit multiple request using SSO.

At 445, the software platform 425 may receive a third request from a second user (e.g., via the client device 405 a) to access the resource using the cloud platform 415-a, which may be associated with the software platform 425. In some examples, the request may be an example of an access request as described throughout the present disclosure including with reference to FIGS. 2 and 3. For example, the third request may be transmitted using a messaging-based application.

At 450, the software platform 425 may authorize the third request using the directory associated with the software platform 425. In some examples, authorization of the third request may be performed at the software platform 425 in accordance with the authorization model and based on a second credential associated with the second user.

Figure 5:
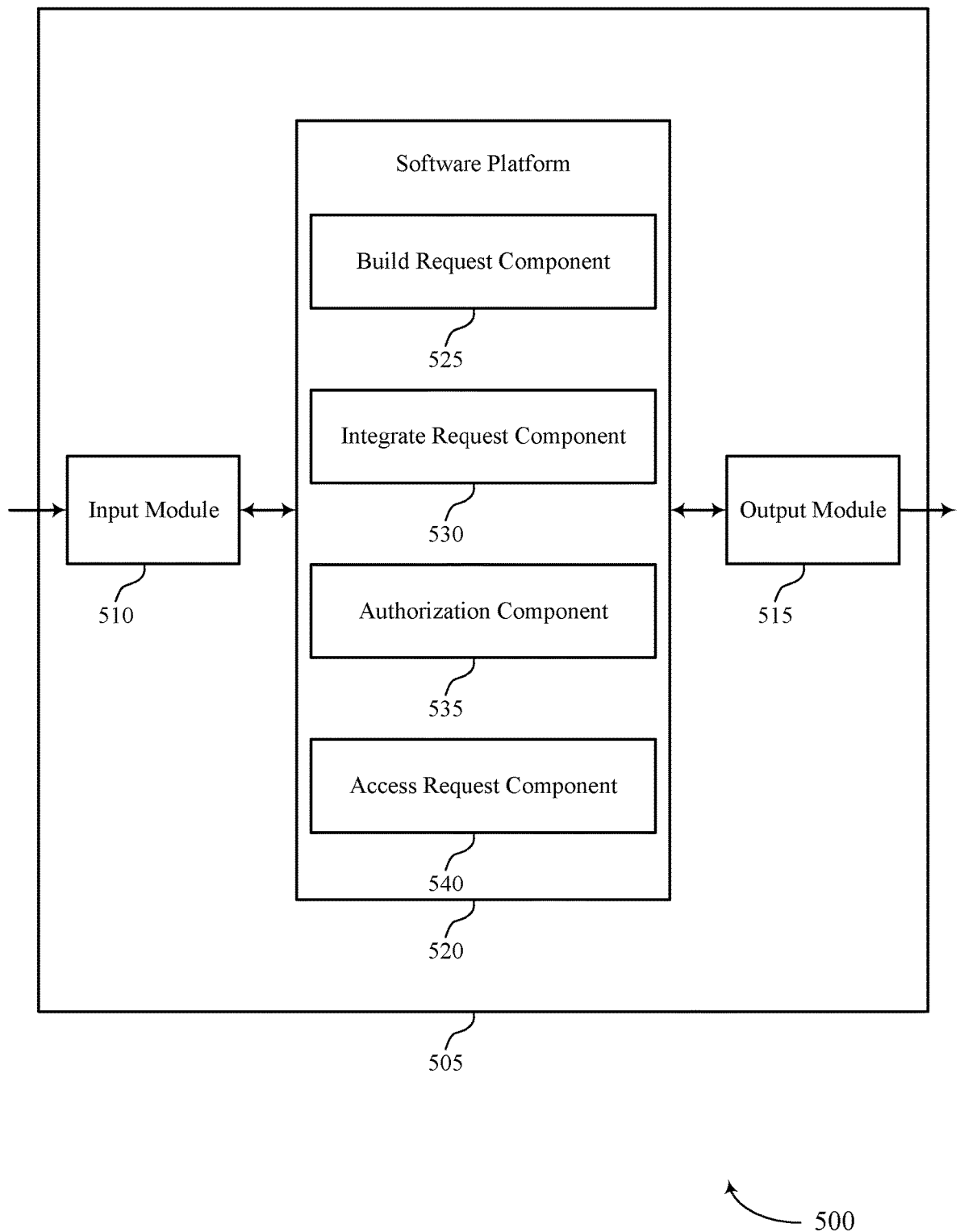
FIG. 5 illustrates a block diagram of an apparatus that supports techniques for unifying multiple identity clouds in accordance with aspects of the present disclosure.

FIG. 5 illustrates a block diagram 500 of a device 505 that supports techniques for unifying multiple identity clouds in accordance with aspects of the present disclosure. The device 505 may include an input module 510, an output module 515, and a software platform 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the software platform 520 to support techniques for unifying multiple identity clouds. In some cases, the input module 510 may be a component of an I/O controller 710 as described with reference to FIG. 7.

The output module 515 may manage output signals for the device 505. For example, the output module 515 may receive signals from other components of the device 505, such as the software platform 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the software platform 520 may include a build request component 525, an integrate request component 530, an authorization component 535, an access request component 540, or any combination thereof. In some examples, the software platform 520, or various components thereof, may be configured to perform various operations (e.g., receiving, monitoring, transmitting) using or otherwise in cooperation with the input module 510, the output module 515, or both. For example, the software platform 520 may receive information from the input module 510, send information to the output module 515, or be integrated in combination with the input module 510, the output module 515, or both to receive information, transmit information, or perform various other operations as described herein.

The software platform 520 may support managing resources at a software platform of a device in accordance with examples as disclosed herein. The build request component 525 may be configured to support receiving, from a first user, a first request to build an authorization model for a resource using a first cloud platform associated with the software platform, where the authorization model identifies one or more parameters associated with accessing the resource using a second cloud platform associated with the software platform. The integrate request component 530 may be configured to support receiving, from the first user, a second request to integrate the resource with the second cloud platform in accordance with the authorization model. The authorization component 535 may be configured to support authorizing the first request and the second request using a directory associated with the software platform, where authorization of the first request and the second request is based on a first credential associated with the first user. The access request component 540 may be configured to support receiving, from a second user, a third request to access the resource using the second cloud platform associated with the software platform. The authorization component 535 may be configured to support authorizing the third request using the directory associated with the software platform, where the authorization of the third request is in accordance with the authorization model and based on a second credential associated with the second user.

Figure 6:
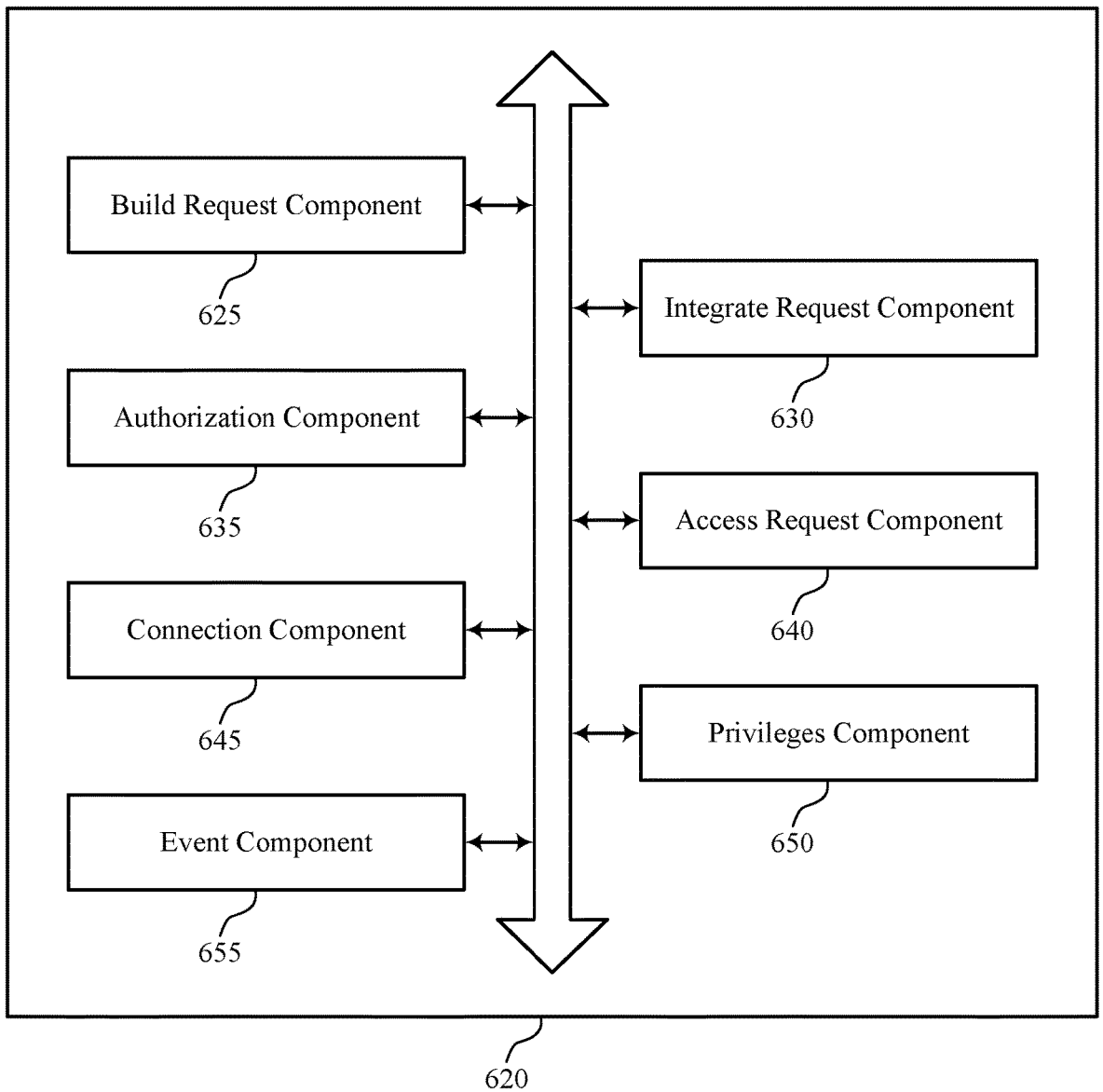
FIG. 6 illustrates a block diagram of a software platform that supports techniques for unifying multiple identity clouds in accordance with aspects of the present disclosure.

FIG. 6 illustrates a block diagram 600 of a software platform 620 that supports techniques for unifying multiple identity clouds in accordance with aspects of the present disclosure. The software platform 620 may be an example of aspects of a software platform or a software platform 520, or both, as described herein. The software platform 620, or various components thereof, may be an example of means for performing various aspects of techniques for unifying multiple identity clouds as described herein. For example, the software platform 620 may include a build request component 625, an integrate request component 630, an authorization component 635, an access request component 640, a connection component 645, a privileges component 650, an event component 655, or any combination thereof. Each of these components may communicate, directly or indirectly, with one another (e.g., via one or more buses).

The software platform 620 may support managing resources at a software platform of a device in accordance with examples as disclosed herein. The build request component 625 may be configured to support receiving, from a first user, a first request to build an authorization model for a resource using a first cloud platform associated with the software platform, where the authorization model identifies one or more parameters associated with accessing the resource using a second cloud platform associated with the software platform. The integrate request component 630 may be configured to support receiving, from the first user, a second request to integrate the resource with the second cloud platform in accordance with the authorization model. The authorization component 635 may be configured to support authorizing the first request and the second request using a directory associated with the software platform, where authorization of the first request and the second request is based on a first credential associated with the first user. The access request component 640 may be configured to support receiving, from a second user, a third request to access the resource using the second cloud platform associated with the software platform. In some examples, the authorization component 635 may be configured to support authorizing the third request using the directory associated with the software platform, where the authorization of the third request is in accordance with the authorization model and based on a second credential associated with the second user.

In some examples, the connection component 645 may be configured to support establishing a connection between the second cloud platform and the resource in response to authorizing the third request. In some examples, the authorization component 635 may be configured to support establishing an authorization scheme using the connection between the second cloud platform and the resource in accordance with the authorization model, where the authorization scheme includes single-sign-on authorization.

In some examples, the privileges component 650 may be configured to support assigning privileges to the second user using the connection between the second cloud platform and the resource, where the privileges are based on the authorization model. In some examples, the connection component 645 may be configured to support transmitting, to the first user and based on the connection between the second cloud platform and the resource, information corresponding to a security event associated with the resource.

In some examples, the connection component 645 may be configured to support receiving, from the first user and based on the connection between the second cloud platform and the resource, information corresponding to a security event associated with the resource. In some examples, the event component 655 may be configured to support transmitting, to the second user, the information corresponding to the security event associated with the resource. In some examples, the resource is included within a software application.

Figure 7:
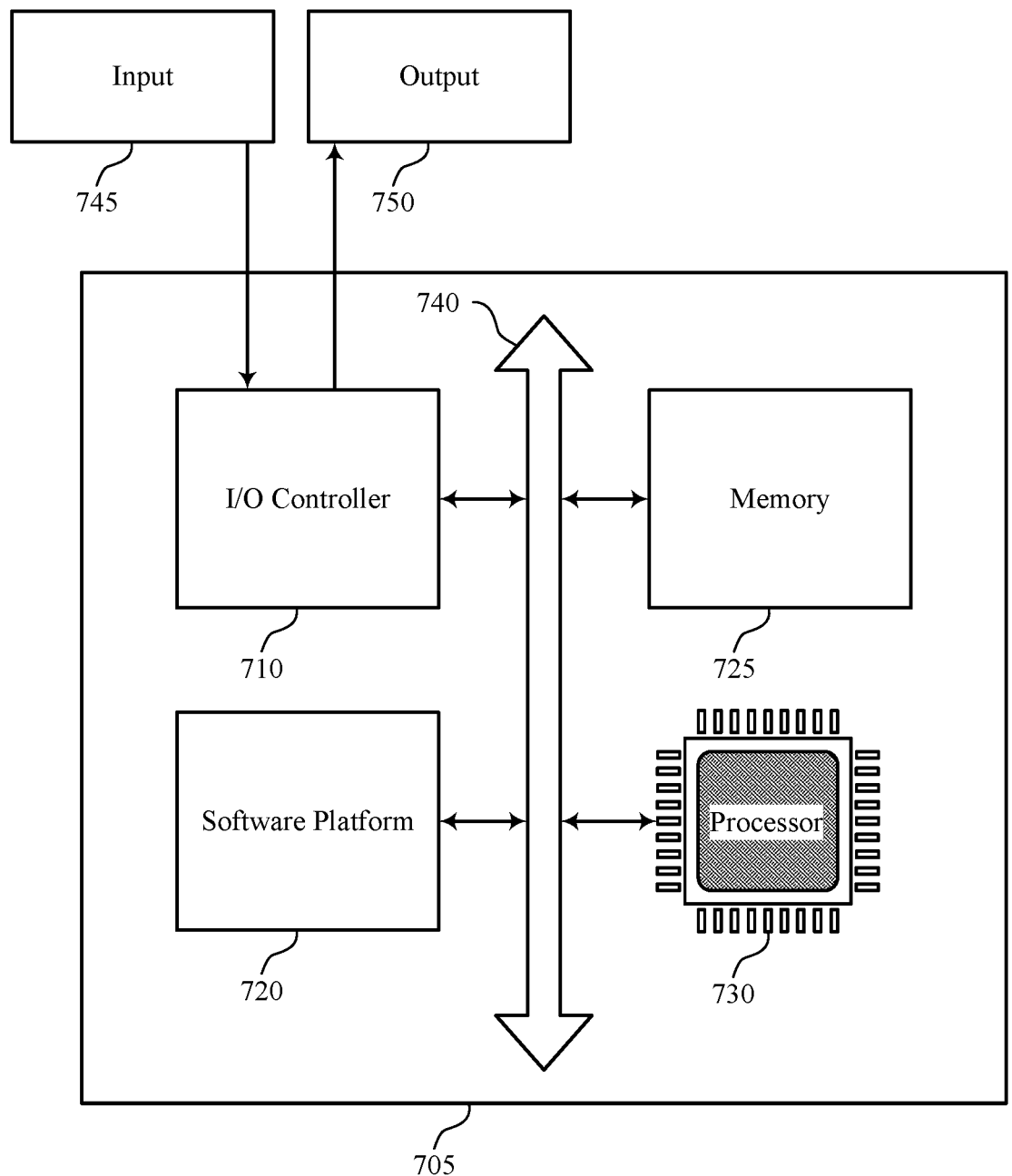
FIG. 7 illustrates a diagram of a system including a device that supports techniques for unifying multiple identity clouds in accordance with aspects of the present disclosure.

FIG. 7 illustrates a diagram of a system 700 including a device 705 that supports techniques for unifying multiple identity clouds in accordance with aspects of the present disclosure. The device 705 may be an example of or include the components of a device 505 as described herein. The device 705 may include components for bi-directional data communications including components for transmitting and receiving communications, such as a software platform 720, an I/O controller 710, a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for unifying multiple identity clouds).

The software platform 720 may support managing resources at a software platform of a device in accordance with examples as disclosed herein. For example, the software platform 720 may be configured to support receiving, from a first user, a first request to build an authorization model for a resource using a first cloud platform associated with the software platform, where the authorization model identifies one or more parameters associated with accessing the resource using a second cloud platform associated with the software platform. The software platform 720 may be configured to support receiving, from the first user, a second request to integrate the resource with the second cloud platform in accordance with the authorization model. The software platform 720 may be configured to support authorizing the first request and the second request using a directory associated with the software platform, where authorization of the first request and the second request is based on a first credential associated with the first user. The software platform 720 may be configured to support receiving, from a second user, a third request to access the resource using the second cloud platform associated with the software platform. The software platform 720 may be configured to support authorizing the third request using the directory associated with the software platform, where the authorization of the third request is in accordance with the authorization model and based on a second credential associated with the second user.

By including or configuring the software platform 720 in accordance with examples as described herein, the device 705 may support techniques for reduced latency, improved user experience.

Figure 8:
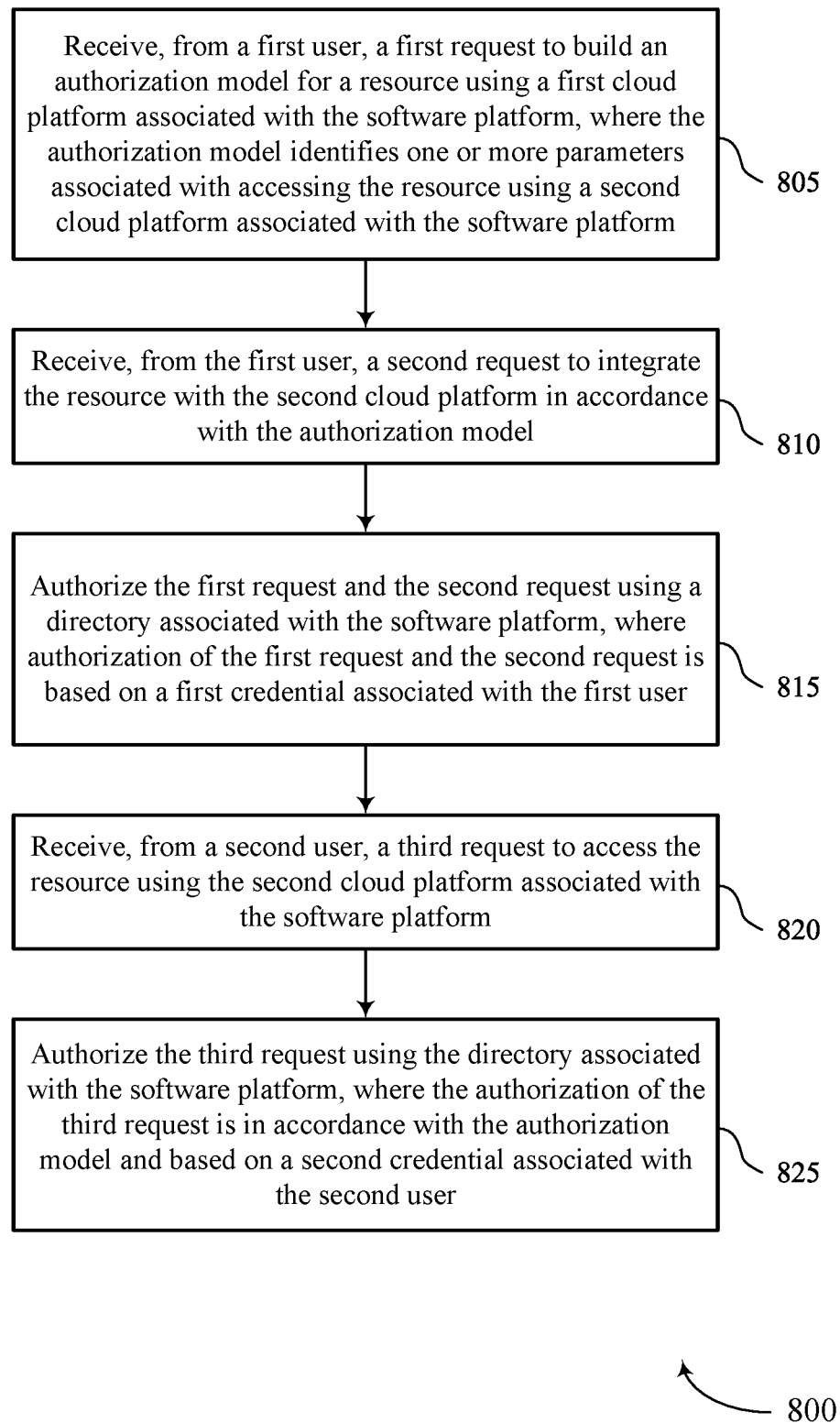
FIGS. 8 and 9 illustrate flowcharts showing methods that support techniques for unifying multiple identity clouds in accordance with aspects of the present disclosure.

FIG. 8 illustrates a flowchart showing a method 800 that supports techniques for unifying multiple identity clouds in accordance with aspects of the present disclosure. The operations of the method 800 may be implemented by a device or its components as described herein. For example, the operations of the method 800 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 805, the method may include receiving, from a first user, a first request to build an authorization model for a resource using a first cloud platform associated with the software platform, where the authorization model identifies one or more parameters associated with accessing the resource using a second cloud platform associated with the software platform. The operations of 805 may be performed in accordance with examples as disclosed herein. In some examples, aspects of the operations of 805 may be performed by a build request component 625 as described with reference to FIG. 6.

At 810, the method may include receiving, from the first user, a second request to integrate the resource with the second cloud platform in accordance with the authorization model. The operations of 810 may be performed in accordance with examples as disclosed herein. In some examples, aspects of the operations of 810 may be performed by an integrate request component 630 as described with reference to FIG. 6.

At 815, the method may include authorizing the first request and the second request using a directory associated with the software platform, where authorization of the first request and the second request is based on a first credential associated with the first user. The operations of 815 may be performed in accordance with examples as disclosed herein. In some examples, aspects of the operations of 815 may be performed by an authorization component 635 as described with reference to FIG. 6.

At 820, the method may include receiving, from a second user, a third request to access the resource using the second cloud platform associated with the software platform. The operations of 820 may be performed in accordance with examples as disclosed herein. In some examples, aspects of the operations of 820 may be performed by an access request component 640 as described with reference to FIG. 6.

At 825, the method may include authorizing the third request using the directory associated with the software platform, where the authorization of the third request is in accordance with the authorization model and based on a second credential associated with the second user. The operations of 825 may be performed in accordance with examples as disclosed herein. In some examples, aspects of the operations of 825 may be performed by an authorization component 635 as described with reference to FIG. 6.

Figure 9:
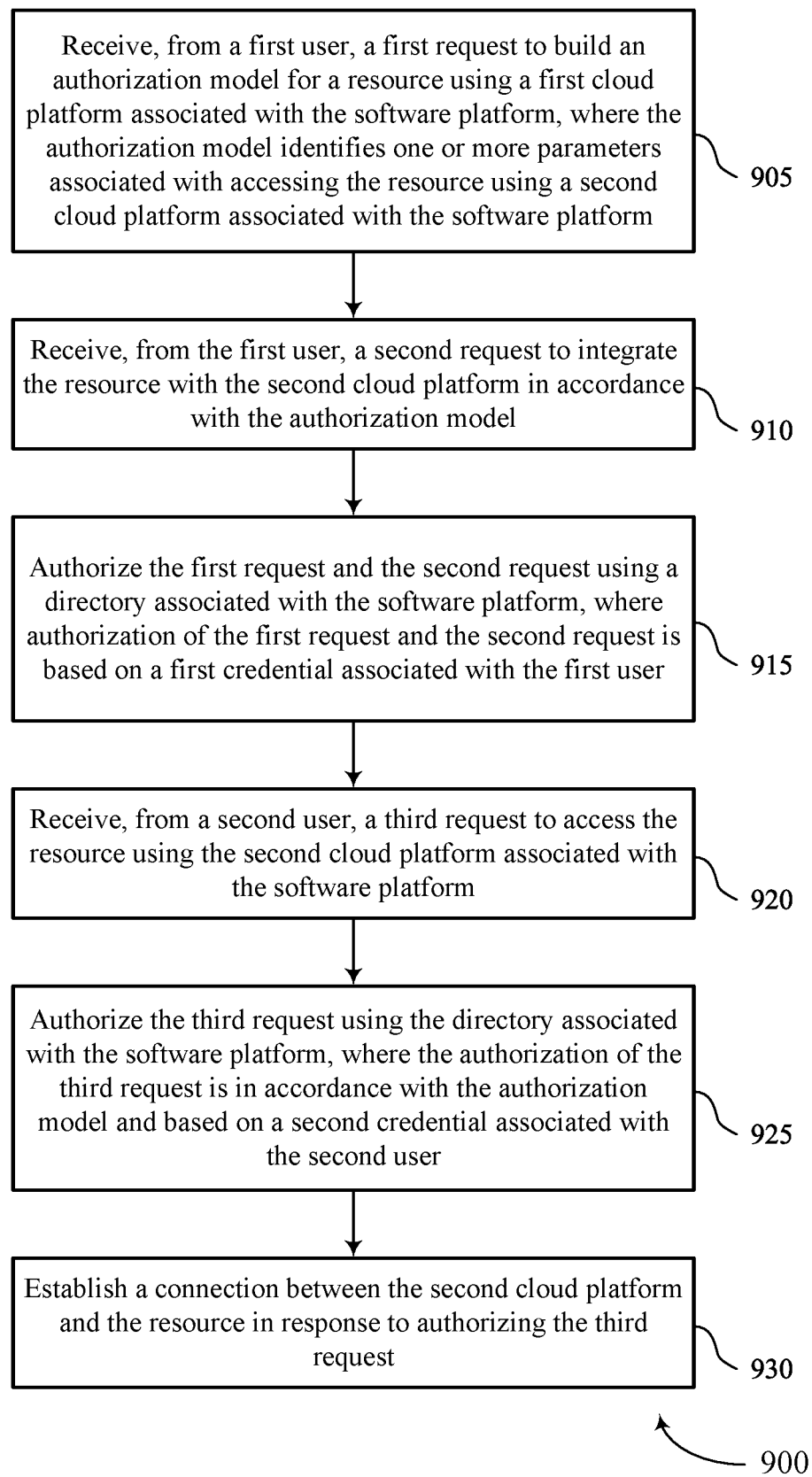

FIG. 9 illustrates a flowchart showing a method 900 that supports techniques for unifying multiple identity clouds in accordance with aspects of the present disclosure. The operations of the method 900 may be implemented by a device or its components as described herein. For example, the operations of the method 900 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 905, the method may include receiving, from a first user, a first request to build an authorization model for a resource using a first cloud platform associated with the software platform, where the authorization model identifies one or more parameters associated with accessing the resource using a second cloud platform associated with the software platform. The operations of 905 may be performed in accordance with examples as disclosed herein. In some examples, aspects of the operations of 905 may be performed by a build request component 625 as described with reference to FIG. 6.

At 910, the method may include receiving, from the first user, a second request to integrate the resource with the second cloud platform in accordance with the authorization model. The operations of 910 may be performed in accordance with examples as disclosed herein. In some examples, aspects of the operations of 910 may be performed by an integrate request component 630 as described with reference to FIG. 6.

At 915, the method may include authorizing the first request and the second request using a directory associated with the software platform, where authorization of the first request and the second request is based on a first credential associated with the first user. The operations of 915 may be performed in accordance with examples as disclosed herein.

In some examples, aspects of the operations of 915 may be performed by an authorization component 635 as described with reference to FIG. 6.

At 920, the method may include receiving, from a second user, a third request to access the resource using the second cloud platform associated with the software platform. The operations of 920 may be performed in accordance with examples as disclosed herein. In some examples, aspects of the operations of 920 may be performed by an access request component 640 as described with reference to FIG. 6.

At 925, the method may include authorizing the third request using the directory associated with the software platform, where the authorization of the third request is in accordance with the authorization model and based on a second credential associated with the second user. The operations of 925 may be performed in accordance with examples as disclosed herein. In some examples, aspects of the operations of 925 may be performed by an authorization component 635 as described with reference to FIG. 6.

At 930, the method may include establishing a connection between the second cloud platform and the resource in response to authorizing the third request. The operations of 930 may be performed in accordance with examples as disclosed herein. In some examples, aspects of the operations of 930 may be performed by a connection component 645 as described with reference to FIG. 6.

A method for managing resources at a software platform of a device is described. The method may include receiving, from a first user, a first request to build an authorization model for a resource using a first cloud platform associated with the software platform, where the authorization model identifies one or more parameters associated with accessing the resource using a second cloud platform associated with the software platform, receiving, from the first user, a second request to integrate the resource with the second cloud platform in accordance with the authorization model, authorizing the first request and the second request using a directory associated with the software platform, where authorization of the first request and the second request is based on a first credential associated with the first user, receiving, from a second user, a third request to access the resource using the second cloud platform associated with the software platform, and authorizing the third request using the directory associated with the software platform, where the authorization of the third request is in accordance with the authorization model and based on a second credential associated with the second user.

An apparatus for managing resources at a software platform of a device is described. The apparatus may include a processor, memory coupled with the processor, and instructions stored in the memory. The instructions may be executable by the processor to cause the apparatus to receive, from a first user, a first request to build an authorization model for a resource using a first cloud platform associated with the software platform, where the authorization model identifies one or more parameters associated with accessing the resource using a second cloud platform associated with the software platform, receive, from the first user, a second request to integrate the resource with the second cloud platform in accordance with the authorization model, authorize the first request and the second request using a directory associated with the software platform, where authorization of the first request and the second request is based on a first credential associated with the first user, receive, from a second user, a third request to access the resource using the second cloud platform associated with the software platform, and authorize the third request using the directory associated with the software platform, where the authorization of the third request is in accordance with the authorization model and based on a second credential associated with the second user.

Another apparatus for managing resources at a software platform of a device is described. The apparatus may include means for receiving, from a first user, a first request to build an authorization model for a resource using a first cloud platform associated with the software platform, where the authorization model identifies one or more parameters associated with accessing the resource using a second cloud platform associated with the software platform, means for receiving, from the first user, a second request to integrate the resource with the second cloud platform in accordance with the authorization model, means for authorizing the first request and the second request using a directory associated with the software platform, where authorization of the first request and the second request is based on a first credential associated with the first user, means for receiving, from a second user, a third request to access the resource using the second cloud platform associated with the software platform, and means for authorizing the third request using the directory associated with the software platform, where the authorization of the third request is in accordance with the authorization model and based on a second credential associated with the second user.

A non-transitory computer-readable medium storing code for managing resources at a software platform of a device is described. The code may include instructions executable by a processor to receive, from a first user, a first request to build an authorization model for a resource using a first cloud platform associated with the software platform, where the authorization model identifies one or more parameters associated with accessing the resource using a second cloud platform associated with the software platform, receive, from the first user, a second request to integrate the resource with the second cloud platform in accordance with the authorization model, authorize the first request and the second request using a directory associated with the software platform, where authorization of the first request and the second request is based on a first credential associated with the first user, receive, from a second user, a third request to access the resource using the second cloud platform associated with the software platform, and authorize the third request using the directory associated with the software platform, where the authorization of the third request is in accordance with the authorization model and based on a second credential associated with the second user.

Some examples of the method, apparatuses, and non-transitory computer-readable medium described herein may further include operations, features, means, or instructions for establishing a connection between the second cloud platform and the resource in response to authorizing the third request.

Some examples of the method, apparatuses, and non-transitory computer-readable medium described herein may further include operations, features, means, or instructions for establishing an authorization scheme using the connection between the second cloud platform and the resource in accordance with the authorization model, where the authorization scheme includes single-sign-on authorization.

Some examples of the method, apparatuses, and non-transitory computer-readable medium described herein may further include operations, features, means, or instructions for assigning privileges to the second user using the connection between the second cloud platform and the resource, where the privileges may be based on the authorization model.

Some examples of the method, apparatuses, and non-transitory computer-readable medium described herein may further include operations, features, means, or instructions for transmitting, to the first user and based on the connection between the second cloud platform and the resource, information corresponding to a security event associated with the resource.

Some examples of the method, apparatuses, and non-transitory computer-readable medium described herein may further include operations, features, means, or instructions for receive, from the first user and based on the connection between the second cloud platform and the resource, information corresponding to a security event associated with the resource.

Some examples of the method, apparatuses, and non-transitory computer-readable medium described herein may further include operations, features, means, or instructions for transmitting, to the second user, the information corresponding to the security event associated with the resource.

In some examples of the method, apparatuses, and non-transitory computer-readable medium described herein, the resource may be included within a software application.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing resources at a software platform of a device, comprising:
receiving, from a first user associated with an application, a first request to build an authorization model for a resource of the application using a first cloud platform associated with the software platform, the first cloud platform including one or more features associated with authentication management across a plurality of applications comprising the application, wherein the authorization model identifies one or more parameters associated with accessing the resource via a second cloud platform associated with the software platform, the second cloud platform used by a plurality of organizations;
receiving, from the first user, a second request to integrate the resource with the second cloud platform in accordance with the authorization model, wherein the resource is accessible via the second cloud platform in accordance with integration of the resource with the second cloud platform;
authorizing the first request and the second request using a directory associated with the software platform, wherein authorization of the first request and the second request is based at least in part on a first credential associated with the first user;
receiving, from a second user of an organization of the plurality of organizations, a third request to access the resource of the application via the second cloud platform associated with the software platform; and
authorizing the third request using the directory associated with the software platform, wherein the authorization of the third request is in accordance with the authorization model and based at least in part on a second credential associated with the second user.

2. The method of claim 1, further comprising:
establishing a connection between the second cloud platform and the resource in response to authorizing the third request.

3. The method of claim 2, further comprising:
establishing an authorization scheme using the connection between the second cloud platform and the resource in accordance with the authorization model, wherein the authorization scheme comprises single-sign-on authorization.

4. The method of claim 2, further comprising:
assigning privileges to the second user using the connection between the second cloud platform and the resource, wherein the privileges are based at least in part on the authorization model.

5. The method of claim 2, further comprising:
transmitting, to the first user and based at least in part on the connection between the second cloud platform and the resource, information corresponding to a security event associated with the resource.

6. The method of claim 2, further comprising:
receiving, from the first user and based at least in part on the connection between the second cloud platform and the resource, information corresponding to a security event associated with the resource.

7. The method of claim 6, further comprising:
transmitting, to the second user, the information corresponding to the security event associated with the resource.

8. The method of claim 1, wherein the resource is included within a software application.

9. An apparatus for managing resources at a software platform of a device, comprising:
a processor;
memory coupled with the processor; and
instructions stored in the memory and executable by the processor to cause the apparatus to:
receive, from a first user associated with an application, a first request to build an authorization model for a resource of the application using a first cloud platform associated with the software platform, the first cloud platform including one or more features associated with authentication management across a plurality of applications comprising the application, wherein the authorization model identifies one or more parameters associated with accessing the resource via a second cloud platform associated with the software platform, the second cloud platform used by a plurality of organizations;
receive, from the first user, a second request to integrate the resource with the second cloud platform in accordance with the authorization model, wherein the resource is accessible via the second cloud platform in accordance with integration of the resource with the second cloud platform;
authorize the first request and the second request using a directory associated with the software platform, wherein authorization of the first request and the second request is based at least in part on a first credential associated with the first user;
receive, from a second user of an organization of the plurality of organizations, a third request to access the resource of the application via the second cloud platform associated with the software platform; and
authorize the third request using the directory associated with the software platform, wherein the authorization of the third request is in accordance with the authorization model and based at least in part on a second credential associated with the second user.

10. The apparatus of claim 9, wherein the instructions are further executable by the processor to cause the apparatus to:
establish a connection between the second cloud platform and the resource in response to authorizing the third request.

11. The apparatus of claim 10, wherein the instructions are further executable by the processor to cause the apparatus to:
establish an authorization scheme using the connection between the second cloud platform and the resource in accordance with the authorization model, wherein the authorization scheme comprises single-sign-on authorization.

12. The apparatus of claim 10, wherein the instructions are further executable by the processor to cause the apparatus to:
assign privileges to the second user using the connection between the second cloud platform and the resource, wherein the privileges are based at least in part on the authorization model.

13. The apparatus of claim 10, wherein the instructions are further executable by the processor to cause the apparatus to:

transmit, to the first user and based at least in part on the connection between the second cloud platform and the resource, information corresponding to a security event associated with the resource.

14. The apparatus of claim 10, wherein the instructions are further executable by the processor to cause the apparatus to:
receive, from the first user and based at least in part on the connection between the second cloud platform and the resource, information corresponding to a security event associated with the resource.

15. The apparatus of claim 14, wherein the instructions are further executable by the processor to cause the apparatus to:
transmit, to the second user, the information corresponding to the security event associated with the resource.

16. The apparatus of claim 9, wherein the resource is included within a software application.

17. A non-transitory computer-readable medium storing code for managing resources at a software platform of a device, the code comprising instructions executable by a processor to:
receive, from a first user associated with an application, a first request to build an authorization model for a resource of the application using a first cloud platform associated with the software platform, the first cloud platform including one or more features associated with authentication management across a plurality of applications comprising the application, wherein the authorization model identifies one or more parameters associated with accessing the resource via a second cloud platform associated with the software platform, the second cloud platform used by a plurality of organizations;
receive, from the first user, a second request to integrate the resource with the second cloud platform in accordance with the authorization model, wherein the resource is accessible via the second cloud platform in accordance with integration of the resource with the second cloud platform;
authorize the first request and the second request using a directory associated with the software platform, wherein authorization of the first request and the second request is based at least in part on a first credential associated with the first user;
receive, from a second user of an organization of the plurality of organizations, a third request to access the resource of the application via the second cloud platform associated with the software platform; and
authorize the third request using the directory associated with the software platform, wherein the authorization of the third request is in accordance with the authorization model and based at least in part on a second credential associated with the second user.

18. The non-transitory computer-readable medium of claim 17, wherein the instructions are further executable by the processor to:
establish a connection between the second cloud platform and the resource in response to authorizing the third request.

19. The non-transitory computer-readable medium of claim 18, wherein the instructions are further executable by the processor to:
establish an authorization scheme using the connection between the second cloud platform and the resource in accordance with the authorization model, wherein the authorization scheme comprises single-sign-on authorization.

20. The non-transitory computer-readable medium of claim 18, wherein the instructions are further executable by the processor to:
assign privileges to the second user using the connection between the second cloud platform and the resource, wherein the privileges are based at least in part on the authorization model.

* * * * *